United States Patent
Durack et al.

(10) Patent No.: US 11,858,008 B2
(45) Date of Patent: Jan. 2, 2024

(54) SYSTEMS AND METHODS FOR PARTICLE SORTING WITH AUTOMATED ADJUSTMENT OF OPERATIONAL PARAMETERS

(71) Applicant: CYTONOME/ST, LLC, Bedford, MA (US)

(72) Inventors: Gary Durack, Urbana, IL (US); William J. Williams, V, Medford, MA (US)

(73) Assignee: CYTONOME/ST, LLC, Bedford, MA (US)

( * ) Notice: Subject to any disclaimer, the term of this patent is extended or adjusted under 35 U.S.C. 154(b) by 0 days.

(21) Appl. No.: 17/706,432

(22) Filed: Mar. 28, 2022

(65) Prior Publication Data

US 2022/0305529 A1   Sep. 29, 2022

Related U.S. Application Data

(60) Provisional application No. 63/166,635, filed on Mar. 26, 2021.

(51) Int. Cl.
  *B07C 5/34* (2006.01)
  *B07C 5/342* (2006.01)
  *B07C 5/36* (2006.01)

(52) U.S. Cl.
  CPC ............ *B07C 5/3425* (2013.01); *B07C 5/362* (2013.01)

(58) Field of Classification Search
  CPC .......... G01N 14/1404; G01N 14/1485; G01N 2015/149; G01N 15/10; G05B 13/00; G05B 13/24; B07C 5/3425; B07C 5/361
  See application file for complete search history.

(56) References Cited

U.S. PATENT DOCUMENTS

| | | |
|---|---|---|
| 3,373,437 A | 3/1968 | Sweet |
| 3,380,584 A | 4/1968 | Fulwyler |
| 5,135,759 A | 8/1992 | Johnson |
| 6,263,745 B1 | 7/2001 | Buchanan et al. |
| 6,372,506 B1 | 4/2002 | Norton |
| 6,782,768 B2 | 8/2004 | Buchanan et al. |

(Continued)

OTHER PUBLICATIONS

MoFlo® Hands-On Training Manual, Document No. 0000148 Revision B. MoFlo@ Hands-On Training Course. 222 pages, Jul. 2006.

(Continued)

*Primary Examiner* — Joseph C Rodriguez
(74) *Attorney, Agent, or Firm* — McCarter & English, LLP

(57) ABSTRACT

Systems and methods for particle sorting are presented including a monitoring system downstream of a particle separator or sorter. The system can utilize the monitoring system to adjust or calibrate operational parameters of the system in real time. When a particle of interest is mis-sorted, the probability is high that the particle of interest has been sorted into a non-targeted sortable unit that was adjacent in sequence to the sortable unit that was expected to include the particle of interest. The monitoring system monitors non-targeted sortable units in the system that were adjacent in sequence to targeted sortable units that are predicted to contain particles of interest. Signals from the monitoring system enable automated adjustment or calibration of operational parameters of the system such as sort delay or purity mask parameters.

17 Claims, 14 Drawing Sheets

(56) References Cited

U.S. PATENT DOCUMENTS

| | | | |
|---|---|---|---|
| 6,819,411 | B1 | 11/2004 | Sharpe et al. |
| 7,758,811 | B2 | 7/2010 | Durack et al. |
| 8,705,031 | B2 | 4/2014 | Sedoglavich et al. |
| 9,964,968 | B2* | 5/2018 | Sharpe .................. G05D 21/02 |
| 10,274,414 | B2* | 4/2019 | Sharpe ............... G01N 15/1012 |
| 10,379,030 | B2* | 8/2019 | Foster ............... B01L 3/502761 |
| 10,466,158 | B2* | 11/2019 | Otsuka ............... G01N 15/1425 |
| 10,481,069 | B2 | 11/2019 | Sharpe et al. |
| 11,193,874 | B2* | 12/2021 | Muraki .............. G01N 15/1404 |
| 2012/0202237 | A1* | 8/2012 | Sedoglavich .......... G01N 15/14 |
| | | | 435/29 |
| 2012/0277902 | A1* | 11/2012 | Sharpe ............... G01N 15/1404 |
| | | | 209/132 |
| 2013/0256136 | A1 | 10/2013 | Muraki et al. |
| 2018/0214874 | A1* | 8/2018 | Koksal .................. G01N 29/22 |

OTHER PUBLICATIONS

Verwer, BD FACSiVa Option. White Paper, BD Biosciences. www.bdbiosciences.com. Becton, Dickinson and Company. 68 pages, (2002).

Wulff, Flow Cytometry, Educational Guide, 2nd Edition. Dako, Carpenteria, CA. www.dako.com. 68 pages, (2006).

International Search Report and Written Opinion for Application No. PCT/US2022/022207, dated Jun. 27, 2022, 13 pages.

\* cited by examiner

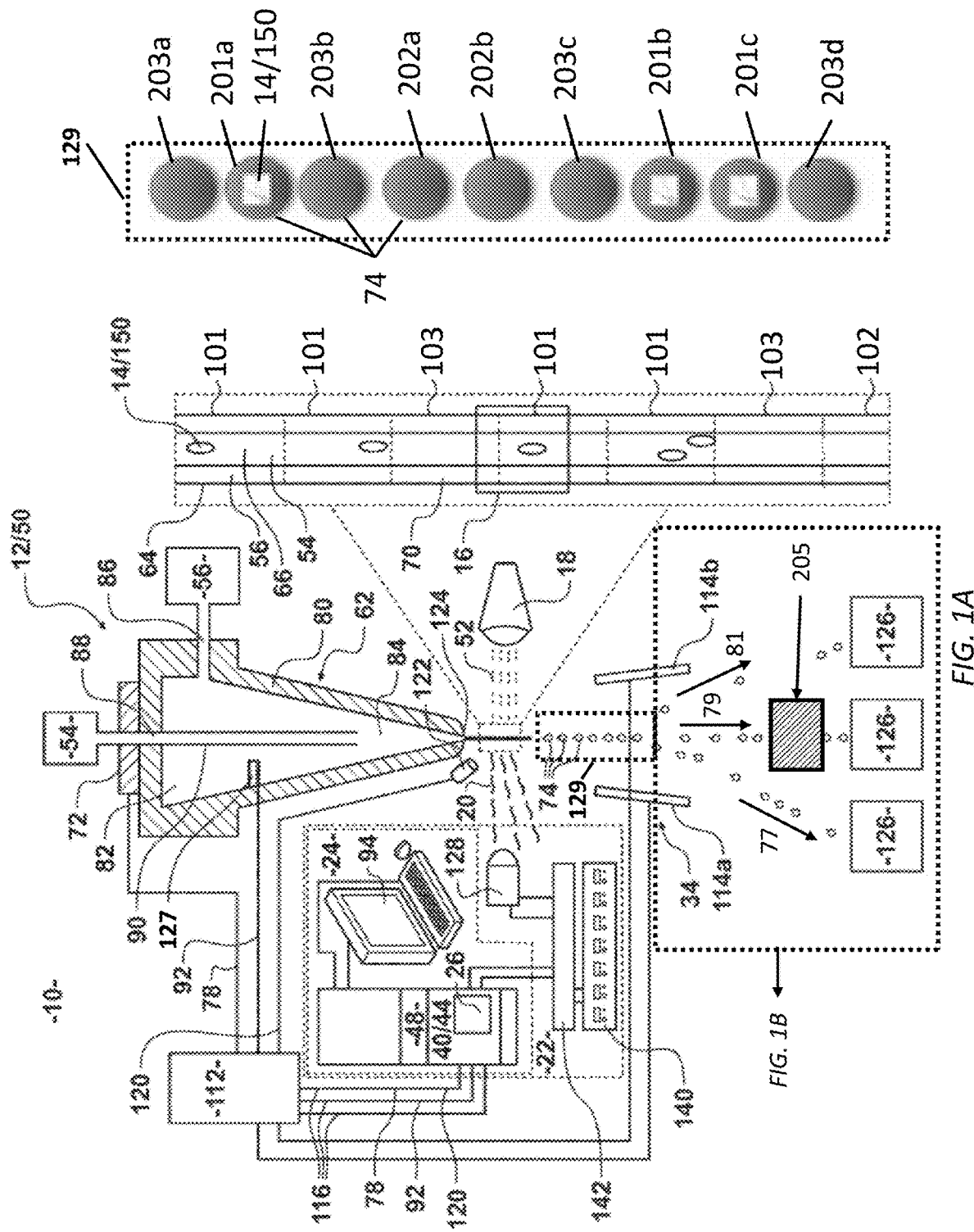

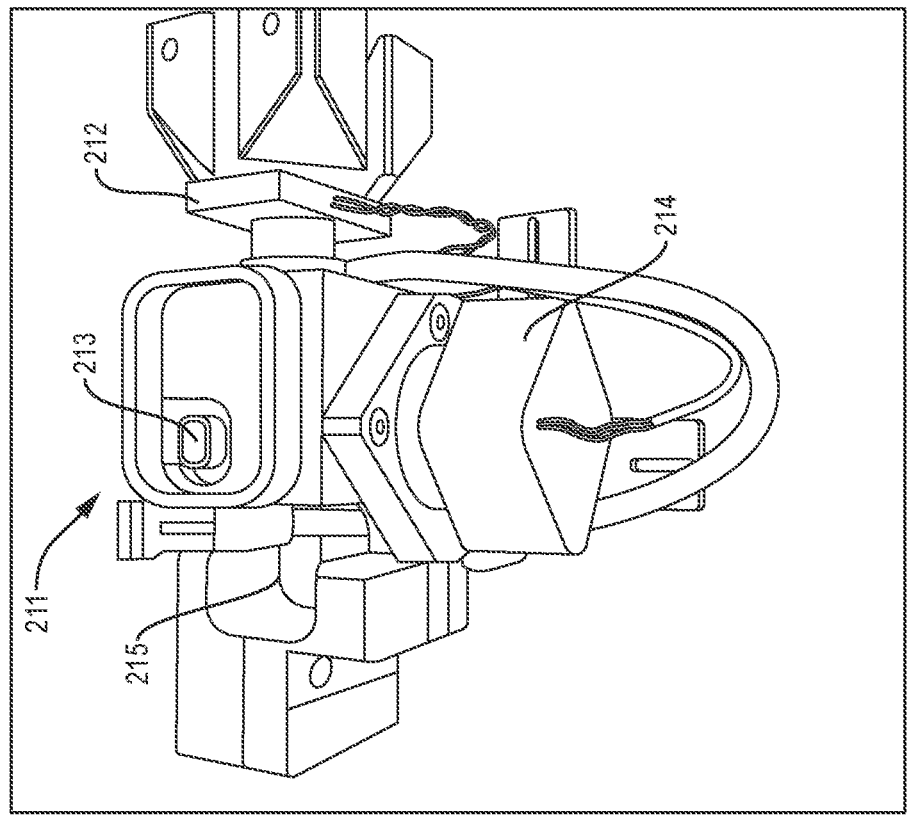
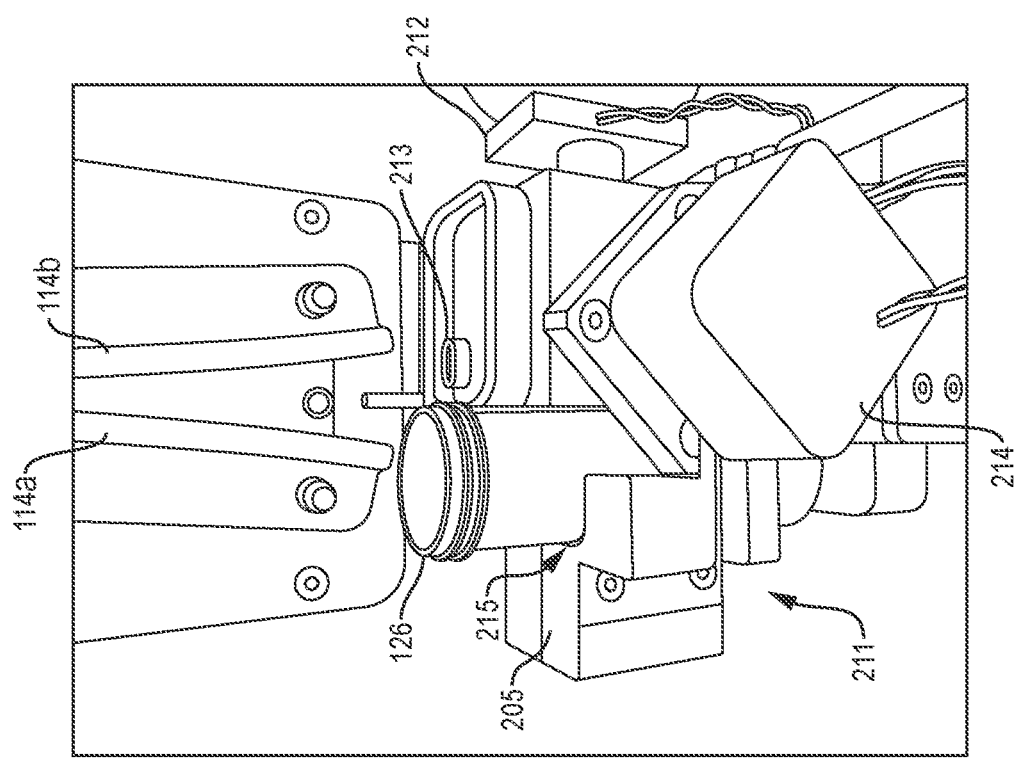
FIG. 3A
FIG. 3B

| | | | Probability | Drops Sorted |
|---|---|---|---|---|
| Average Sample Rate (eps) | | 40,000 | | |
| Droplet Frequency (Hz) | | 65,000 | | |
| Coincidence | | 0.4559 | | |
| | exp | 0.5404 | 0.5441 | 21,764 |
| | 1 | 0.6154 | 0.3326 | 6,651 |
| | 2 | 0.1893 | 0.1023 | 1,364 |
| | 3 | 0.0388 | 0.0210 | 210 |
| | 4 | | | 29,990 |
| Average Segment Loading Fraction | | 46.14% | | |
| Total Occupied Segments per Second | | 29,990 | | |
| Empty Segments per Second | | 25,388 | | |
| Frame Rate (Hz) | | 30 | | |
| Camera Integration Frames | | 5 | | |
| Segments in Integration | | 4,231 | | |
| Intensity in Integration | | 8,687,715 | | |
| Background Count per frame | | 125,000 | | |
| Background Count per Integration | | 850,000 | | |
| Count per Cell | | 1,800 | | |
| Max Count | | 500,000 | | |
| Post and Preceed Occupation | | 0.2129 | | |
| Random Background | | 5,622,827 | | |

FIG. 4B

SYSTEMS AND METHODS FOR PARTICLE SORTING WITH AUTOMATED ADJUSTMENT OF OPERATIONAL PARAMETERS

CROSS-REFERENCE TO RELATED APPLICATIONS

This application claims priority to U.S. Provisional Application No. 63/166,635, filed Mar. 26, 2021, and the entire contents of the above application is incorporated herein by reference.

BACKGROUND

Particle sorting systems can separate particles of interest from a general population of particles flowing in a fluid stream. Such systems can operate on a "detect-decide-deflect" principle wherein particles in the stream are detected, a decision is made as to whether the particle is a particle of interest, and the particles of interest are deflected into one or more keep paths. Operational parameters of a sorting system can be adjusted to change statistical outcomes such as particle recovery and purity.

SUMMARY

A system for sorting particles flowing in a fluid stream is provided. The system includes a particle delivery device for delivering a sequence of two or more sortable units from a fluid stream to an inspection zone. The system also includes an electromagnetic radiation source for interrogating the two or more sortable units at the inspection zone. The system also includes a sorter downstream of the electromagnetic radiation source to sort the two or more sortable units based on a characteristic thereof using a sort logic. The system also includes a monitoring system downstream of the sorter to interrogate non-targeted sortable units that were adjacent to targeted sortable units that are predicted to include one or more particles having a predetermined characteristic of interest in the sequence of sortable units. The system also includes a processing unit operatively connected to the sorter and the monitoring system, the processing unit configured to execute instructions to adjust an operational parameter of the sort logic based upon a result of the interrogation of the adjacent non-targeted sortable units.

A method for calibration of particle sorting in a fluid stream is provided. The method includes delivering a sequence of two or more sortable units from a fluid stream to an inspection zone using a particle delivery device. The method also includes interrogating the two or more sortable units using an electromagnetic radiation source at the inspection zone. The method also includes sorting, using a sorter downstream of the electromagnetic radiation source, the two or more sortable units based on a characteristic thereof using a sort logic. The method also includes interrogating non-targeted sortable units (containing no detectable particles of interest) that were adjacent to targeted sortable units that are predicted to include one or more particles having a predetermined characteristic of interest in the sequence of sortable units using a monitoring system. The method also includes adjusting an operational parameter of the sort logic based upon a result of the interrogation of the adjacent non-targeted sortable units.

A non-transitory computer-readable medium is provided that holds computing device-executable instructions for calibrating particle sorting in a fluid stream. When executed, the instructions cause at least one computing device to deliver a sequence of two or more sortable units from a fluid stream to an inspection zone using a particle delivery device operatively connected to the at least one computing device. The instructions further cause the at least one computing device to interrogate the two or more sortable units using an electromagnetic radiation source at the inspection zone. The instructions further cause the at least one computing device to sort, using a sorter downstream of the electromagnetic radiation source, the two or more sortable units based on a characteristic thereof using a sort logic. The instructions further cause the at least one computing device to interrogate non-targeted sortable units that were adjacent to targeted units that are predicted to include one or more particles having a predetermined characteristic of interest in the sequence of sortable units using a monitoring system. The instructions further cause the at least one computing device to adjust an operational parameter of the sort logic based upon a result of the interrogation of the adjacent non-targeted sortable units.

BRIEF DESCRIPTION OF THE DRAWINGS

The skilled artisan will understand that the drawings are primarily for illustrative purposes and are not intended to limit the scope of the subject matter taught herein. The drawings are not necessarily to scale; in some instances, various aspects of the subject matter disclosed herein may be exaggerated or enlarged in the drawings to facilitate an understanding of different features. In the drawings, like reference characters generally refer to like features (e.g., functionally similar or structurally similar elements).

The foregoing and other features and advantages provided by the present disclosure will be more fully understood from the following description of example embodiments when read together with the accompanying drawings, in which:

FIG. 1A illustrates a particle sorting system including an example monitoring system as taught herein.

FIGS. 3A-3C are views of an example monitoring system as taught herein.

FIG. 4B is a table listing several inputs and outputs for the simulation that generated the data illustrated in FIG. 4A.

DETAILED DESCRIPTION

Figure 1B:
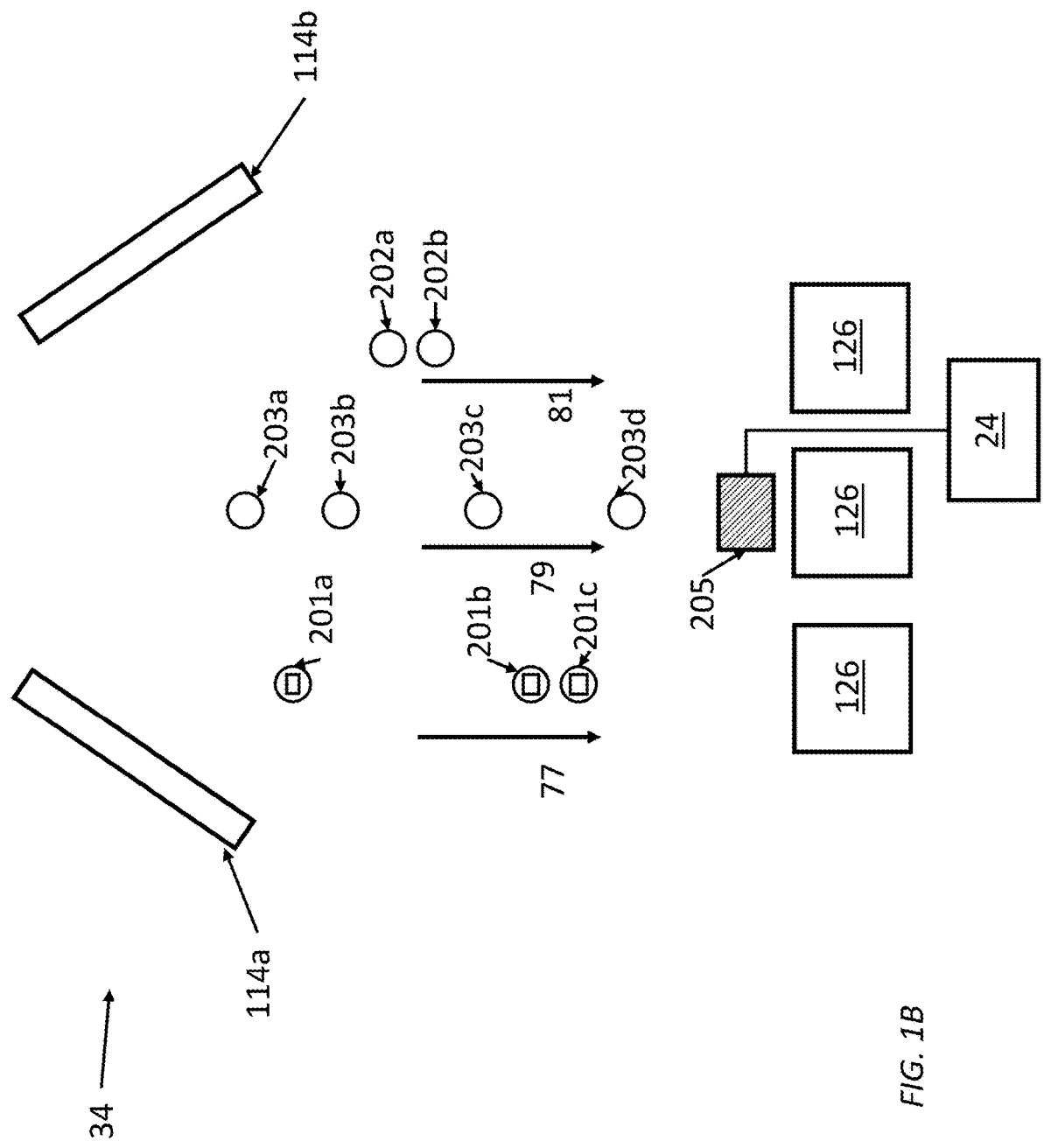
FIG. 1B illustrates an enlarged view of a portion of FIG. 1A.

The present application relates to particle sorting systems that include a monitoring system downstream of a particle separator or sorter. The particle sorting system utilizes a sort delay to determine when to actuate the separator to perform a sort operation to sort a particle of interest. The sort delay represents the time between when the expected sortable unit containing one or more particles of interest is interrogated and the time when the actual sortable unit predicted to contain the one or more particles of interest is in position to be sorted by the sorter or separator. When the sort delay value is set properly, there are a countable number of non-targeted sortable units that are adjacent in time (succeeding or preceding) to targeted sortable units that contain or are predicted to contain particles of interest. The monitoring system is used to determine the proper drop delay parameter for the sorter. In some embodiments, the proper drop delay parameter may be determined by the monitoring system before the start of a sort operation. In some embodiments, the proper drop delay parameter may be determined by the monitoring system during a sort operation.

In some systems and methods taught herein, sortable units (e.g., sortable fluid segments or droplets or expected droplets) are identified that are non-targeted, for example, that are expected to contain no particles of interest or, in some cases, no particles (i.e., empty), but that are positionally adjacent (i.e., either immediately before or after in sequence) to sortable units that are targeted, for example, that are predicted to contain one or more particles of interest. After the adjacent non-targeted sortable units and the targeted, particle-containing sortable units have been separated and sorted, optical measurements of the adjacent non-targeted sortable units are generated by the monitoring system to determine fluorescence emission resulting from the presence of particles, for example, particles of interest in the adjacent non-targeted sortable units. By measuring fluorescence emission of the adjacent non-targeted sortable units at a variety of sort delay settings, it is possible to determine the correct or proper sort delay.

In some embodiments, adjacent non-targeted sortable units are presented for measurement by the monitoring system. In other words, sortable units that are not targeted and that are not adjacent to targeted sortable units are ignored and are not measured. The set of adjacent non-targeted sortable units provide a sensitive indicator of correct or proper sort delay because a particle that is predicted to be, but is not, in a targeted sortable unit most likely can be detected in an adjacent non-targeted sortable unit.

The monitoring systems taught herein can monitor adjacent sortable units before, during, or after a sorting operation. The monitoring system provides feedback signals to a processing unit that can adjust operational parameters of the system based upon the signals. Operational parameters that can be adjusted affect sort delay and sort masks. The adjustment of operational parameters can occur in real time during a sort operation for a sample.

Conventionally, operational parameters of particle sorting systems are calibrated in a separate initial step before a sample is placed into the system or by using an initial portion of the sample. This initial calibration occurs at one point in time whether before the sample is placed into the system (and using standard particles such as fluorescent polymer beads) or right after initial sample loading. In the event that beads or non-sample particles are used for calibration, introduction of foreign material into the system could impact the final sorted product, particularly if the experimenter uses the calibration particles in situ to calibrate the system during sample sorting rather than as a separate step. Moreover, exchanging the standard control for the desired sample to be sorted after calibration is complete can potentially introduce changes to the system that introduce a degree of instability in the system. When using an initial portion of the sample itself for calibration, the initial portion must usually be discarded as having unreliable levels of purity, and this is undesirable particularly for valuable samples. In some conventional droplet-sorter systems, the sorting delay is calibrated by determining the stream velocity using strobed imaging that is timed to coincide with droplet formation and measures an undulation wavelength of the stream. In systems that use strobed imaging, precision light sources and imaging detectors that operate at high frequency can be expensive and can require rapid image analysis of detector frames to determine the stream parameters. The systems and methods of the present disclosure overcome these issues in some embodiments by monitoring adjacent non-targeted sortable units in real-time as the sample itself is being sorted. The ability to self-calibrate during processing of a sample avoids the potential for contamination with foreign material, avoids the need to change fluidic connections or control samples after calibration, avoids or reduces wasted sample, and enables continuous calibration throughout a sort operation rather than at only a single point in time before sorting begins. The monitoring of adjacent non-targeted sortable units can be done without strobed imaging, which results in high precision at lower operating cost and system complexity. Real-time adjustment also enables the system to react to changes that may occur in the sample over time such as settling or changes in fluid content or viscosity that can alter the number of particles per second that pass through the device.

Systems and methods described herein also provide the ability to calibrate operational parameters such as sort delay while maintaining high throughput rates. This advantage derives from several improvements over conventional systems. First, the ability to calibrate operational parameters in real time during particle sorting means that a user does not need to stop sorting particles to perform a separate calibration operation, thus leading to greater throughput over multiple samples over time. The time savings can be substantial, particularly over a conventional method of calibration that requires obtaining sorted aliquots on microscope slides at different values of operating parameters and comparing expected counts with actual counts of particles observed under a microscope. To create these sorted aliquots, it is necessary to reduce particle input rates by orders of magnitude to reduce the probability of a sortable unit containing multiple particles. The change in sample rates can cause instability in the system and may not be directly relatable to operation at high sort rates. Systems and methods described herein can perform adjustment or calibration of operating parameters in real time while operating at high throughput values, which avoids the need to slow down the system for calibration or to take time to prepare and observe microscope slides.

Systems and methods described herein provide improvements over other conventional methods of calibration as well. Some conventional systems utilize precise measurement of distance using either manual observation or an imaging system (camera) to measure the distance between the laser/stream intersection and the first free droplet. These systems can also measure the apparent wavelength of the stream undulations (as observed with strobe illumination at the same frequency and phase-locked with droplet generation). The wavelength measurement provides a method to determine stream velocity and therefore time of flight of a particle from the laser intersection to the first free droplet. Another approach used by some conventional systems is to use a calibration particle that can be either added to the sample or run as an independent sample suspension. The sorter can then be programmed to sort all calibration particles. A detector can be used to detect particles in a deflected stream. Delay can be adjusted until the measurement in the deflected stream indicates all particles are sorted (e.g., the delay setting that creates the brightest camera image). In still other conventional systems, an illumination laser is used to illuminate the stream for the purpose of measuring sort delay. The laser is strobed at the same frequency as droplet generation. The first detached droplet along with the adjacent droplets are observed using an imaging system, and sort delay is adjusted until all of the fluorescing particles fall into the correct droplet. These conventional techniques have in common the use of high precision instrumentation, standard calibration particles, and high accuracy timing systems that can be expensive to maintain and can require precise alignment. Systems and methods described herein improve adjustment of operational parameters by using the actual sorted particles of interest to measure the delay (e.g., no contamination with latex particles) and avoiding the use of strobed imaging. The systems and methods described herein that measure adjacent non-targeted sortable units provide a very sensitive measurement of sort delay error, can be used during production sorting, and do not require the interruption of production sorting for calibration purposes.

Systems and methods described herein can be used to measure the sorting error rate and to test the efficacy of sort masks or sort windows applied to improve sorting outcomes such as sample purity. When a particle flowing in a fluid stream is close to the boundary between expected sortable units, there is uncertainty as to which actual sortable unit (on either side of the boundary) ultimately contains the particle. A sort mask or sort window causes the sort logic to reject (i.e., fail to sort) particles that fall near the boundary between expected sortable units. Signals from the monitoring device can be used to determine the sorting error rate in some embodiments. Similarly, signals from the monitoring device can be used to tune the width of such a sort mask or sort window by measuring the rate of particle-droplet correlation error. For example, when the error is high, a low purity sort is possible. The ability for systems and methods taught herein to accurately tune a purity mask while actively sorting a sample enables optimized particle recovery and purity levels.

As used herein, a "sortable unit" is a unit of fluid flowing within a fluid stream in the systems taught herein. A "sortable fluid segment" is a sortable unit of fluid that forms part of a continuous stream. A "droplet" is a sortable unit of fluid that forms part of a discretized stream. In other words, a "sortable fluid segment" shares a fluidic boundary with at least one neighboring sortable fluid segment while a "droplet" does not share a fluidic boundary with a neighboring droplet. "Droplet" is commonly associated with sortable units downstream of a sorter in jet-in-air type particle sorters where the units of fluid are suspended in air. "Sortable fluid segment" is commonly associated with expected sortable units upstream of the sorter in jet-in-air and on-chip systems as well as with sortable units downstream of the sorter in on-chip systems. An "expected sortable unit" is a volume of fluid (i.e., a sortable fluid segment) upstream of a sorter or separator in the system that is predicted or expected to correspond to a resulting sortable unit downstream of the sorter or separator. The expected sortable unit can be defined in some computational contexts as being associated with a time segment during which particles of interest are measured at an inspection zone of the system based on sort delay.

As used herein, the term "particle" includes, but is not limited to, cells (e.g., blood platelets, white blood cells, tumor cells, embryonic cells, spermatozoa and other suitable cells), organelles, and multi-cellular organisms. Particles may include liposomes, proteoliposomes, yeast, bacteria, viruses, pollens, algae, or the like. Additionally, particles may include genetic material, biomolecules, RNA, DNA, proteins, or fragments thereof. Particles may be symmetrical or asymmetrical. Particles may also refer to non-biological particles. For example, particles may include metals, minerals, polymeric substances, glasses, paints, ceramics, composites, or the like. Particles may also refer to synthetic beads (e.g., polystyrene or latex), for example, beads provided with fluorochrome conjugated antibodies.

As used herein, "sort delay" is defined as the electronic time delay taken by a computing device between the time that a sortable unit containing one or more detected particles enters the inspection zone and the execution of a sort operation for that sortable unit to account for the duration of time needed for the sortable unit containing the particle(s) to flow from the point of detection to the point where that sortable unit is separated from neighboring sortable units in the stream (e.g., the point of droplet breakoff in a jet-in-air system or the point where the sorter switches a volume of fluid to a new branch path in an on-chip system). In some embodiments, sort delay can be expressed in units of whole or partial periods of a droplet generation signal. In some embodiments, the sort delay is expressed to the nearest hundredth of a period (i.e., 0.01*clock period). If the sort delay is set improperly in a system, the system may execute sort operations too early (i.e., before the particle has arrived at the sorter, thus leaving one or more particles in a later-forming sortable unit) or too late (i.e., after the particle has passed through the sorter, thus leaving one or more of the particles in a prior-forming sortable unit), which results in incorrect sorting.

In a given sorting operation, particles of interest are identified and sorted to isolate the particles of interest from those particles of an undesired type or possessing an undesired characteristic, fluids, debris, or other unwanted entities. As used herein, "non-targeted" sortable units are those sortable units that are predicted or anticipated to contain zero particles of interest based on the current drop delay setting. The non-targeted sortable units may contain zero or more particles of an undesired type or undesired characteristic, fluids, debris, or other entities. As used herein, "targeted" sortable units are those sortable units that are predicted or anticipated to contain one or more particles of interest based on the current drop delay setting.

Cytometers or particle sorting systems can create sortable units and sort the sortable units into different pathways or buckets. Systems track specific particles of interest and to which expected sortable unit the particles of interest belong. The systems are usually time dependent such that a specific time segment is correlated to each expected sortable unit. One or more particles of interest may pass through the inspection zone during each time segment and are therefore identified as residing in the associated sortable unit. An expected sortable unit that correlates to a time segment during which one or more particles of interest were detected is a "targeted" sortable unit. An expected sortable unit that correlates to a time segment during which no particles of interest were detected is a "non-targeted" sortable unit.

To test the accuracy of the correlation between time segments/expected sortable units and resulting actual sortable units (e.g., droplets), systems and methods of the present disclosure introduce a time variance from a nominal value of sort delay and then observe whether particles of interest intended for a specific targeted sortable unit actually show up in either the preceding adjacent non-targeted sortable unit or the following adjacent non-targeted sortable unit. Under proper operating conditions (e.g., proper values of sort delay meaning correct correlation between time segments/expected sortable units and the resulting actual sortable units), the non-targeted adjacent sortable units should contain no particles of interest. However, randomness associated with the sorting process can cause non-targeted sortable units to contain particles of interest on occasion. In some embodiments, systems and methods described herein can determine the optimal values of sort delay by adjusting the time segment forward and backward in time (i.e., changing sort delay values) while measuring adjacent, non-targeted sortable units until the number of measurements of particles of interest is reduced or minimized.

FIG. 1A illustrates a particle sorting system 10 including a monitoring system 205 in accordance with certain aspects of this disclosure. In this example, the particle sorting system 10 is illustrated as a jet-in-air flow cytometer and the sortable units are often referred to as "droplets." The particle sorting system 10 may include a particle delivery device 12 in the form of a jet-in-air flow cytometer sort head 50, sometimes referred to as a sort head, for delivering two or more sortable units in a fluid stream including particles 14 to a detection system 22 and then to a separator 34, which is sometimes referred to herein as a sorter. The separator 34 directs droplets of fluid, which may be empty or may contain particles, along two or more pathways 77, 79, 81. A monitoring system 205 interrogates non-targeted droplets of fluid that were adjacent in sequence to targeted (e.g., containing particles of interest) droplets of fluid as described in greater detail below. A processing unit 24 operatively connected to the separator 34 and the monitoring system 205 can adjust a sort logic based upon the interrogation of the non-targeted adjacent droplets 203.

The particles 14 may be single cell organisms such as bacteria or individual cells in a fluid, such as various blood cells, sperm or nuclei derived from tissue. Depending on the application, the particles 14 may be stained with a variety of stains, probes, or markers selected to differentiate particles or particle characteristics. Some stains or markers will only bind to particular structures, while others, such as DNA/RNA dyes, may bind UY TM-2 stoichiometrically to nuclear DNA or RNA. Particles 14 may be stained with a fluorescent dye which emits fluorescence in response to an excitation source. As one non-limiting example, sperm may be stained with Hoechst 33342 which stoichiometrically binds to X-chromosomes and Y-chromosomes. U.S. Pat. No. 5,135,759 (Johnson et al.) and U.S. Pat. No. 7,758,811 (Durack et al.) describe methods for staining sperm, and each is incorporated herein by reference in its entirety. In oriented sperm, the relative quantity of Hoechst 33342 can be determined providing means for differentiating X-chromosome bearing sperm from Y-chromosome bearing sperm. Additionally, certain embodiments can work with DNA-sequence specific dyes or sex specific dyes.

The sort head 50 may provide a means for delivering particles 14 to the detection system 22 and more specifically to the inspection zone 16. Other particle delivery devices 12 are contemplated for use herein, such as fluidic channels as described below with respect to FIG. 2. The sort head 50 may include a nozzle assembly 62 for forming a fluid stream 64. The fluid stream 64 may be a coaxial fluid stream 64 having an inner stream 66, referred to as a core stream, containing a sample 54, and an outer stream 70 comprising sheath fluid 56. The sample 54 may include the cells or particles of interest, as well as, biological fluids, and other extenders or components for preserving cells in vivo. The sample 54 may be connected to the nozzle assembly 62 through a sample inlet 88 into a nozzle body 80 having an upstream end 82 and a downstream end 84. An injection needle 90 may be in fluid communication with the sample inlet 88 for delivering the inner stream 66 of the sample 54 centrally within the nozzle body 80 towards the downstream end 84. The sheath fluid 56 may be supplied through a sheath inlet 86 at the upstream end 82 of the nozzle body 80. The sheath fluid 56 may form an outer stream 70 which serves to hydrodynamically focus an inner stream 66 of sample 54 towards the downstream end 84 of the nozzle body 80.

In addition to the formation of the fluid stream 64, the nozzle assembly 62 may serve to orient particles 14 in the sample 54. The interior geometry of the nozzle body 80, in combination with an orienting tip 124, may subject particles, such as aspherical particles, to forces tending to bring them into similar orientations. Examples of interior nozzle body geometries for orienting particles are described in U.S. Pat. Nos. 6,263,745 and 6,782,768, both to Buchanan et al., each of which are incorporated herein by reference. The teachings of this disclosure are also contemplated for use with flow cytometers or other devices configured without orienting means, such as a conventional jet-in-air flow cytometers, or immersion lens flow cytometers, or such as a device described in U.S. Pat. No. 6,819,411, having radial collection or radial illumination means.

In order to perform the function of separating particles, the nozzle assembly 62 may further include an oscillator 72 for breaking the fluid stream 64 into droplets 74 downstream of the inspection zone 16 at a break-off point. The oscillator 72 may include a piezoelectric crystal which perturbs the fluid stream 64 predictably in response to a drop drive signal 78. In FIG. 1A, the drop drive signal 78 is represented by the electrical connection to the oscillator 72 carrying the drop drive signal 78. The waveform shape, phase, amplitude, and frequency of the drop drive signal may directly affect the shape and size of the droplets as well as the presence of satellites. The amplitude, shape, phase, or frequency of the drop drive signal 78 are operational parameters that may be modified during sorting in response to various other operational parameters, event parameters, or measurements.

FIG. 1A provides an enlarged view of the fluid stream 64 including the inner stream 66 and the outer stream 70. The fluid stream 64 is illustrated as being divided into expected sortable fluid segments 101, 102, 103 that are expected to become actual sortable units, e.g., droplets. Some expected sortable fluid segments 101 contain particles 14, which may be sperm cells 150. The dimensions of any of the inner stream 66, outer stream 70, expected sortable fluid segments 101, 102, 103, or particles 14 may not be illustrated to scale. The length of the fluid stream 64 included in each expected sortable fluid segment 101, 102, 103 depends on the frequency of the drop drive signal 78 and the flow velocity of the stream. In some embodiments, the expected sortable fluid segments 101, 102, 103 are mapped by the processing unit 24 (e.g., in a memory) as defined by some time segment or resolution relative to the drop drive clock period, for example, 0.01* the clock period. Similarly, the widths of the inner stream 66 and the outer stream 70 may be determined by the pressure at which sample 54 and sheath fluid are supplied to the nozzle body 80, respectively. One expected sortable fluid segment 101 is illustrated substantially at the inspection zone 16 containing a particle 14 delivered by the particle delivery device 12 for inspection. Two additional expected sortable fluid segments 101 are illustrated containing single particles of interest, while one expected sortable fluid segment 101 is illustrated containing two particles of interest. Thus, expected sortable fluid segments 101 are targeted expected sortable fluid segments. Two other expected sortable fluid segments 103 are illustrated as empty, but these expected sortable fluid segments 103 are adjacent to at least one expected sortable fluid segment 101 that contains a particle. Thus, expected sortable fluid segments 103 are non-targeted adjacent expected sortable fluid segments. One expected sortable fluid segment 102 is illustrated as empty and not adjacent to a stream segment 101 that contains a particle. As such, the expected sortable fluid segments 102 are non-targeted, non-adjacent expected sortable units.

To properly sort or separate droplets containing particles of interest (i.e., targeted) from those that do not (i.e., non-targeted), the timing of each particle measurement (coinciding with the transit of the particle through the inspection zone as described below) is correlated (e.g., by the processing unit 24) with the passage of the specific expected sortable fluid segment that would become a free droplet. In other words, a prediction is made, at the time of measurement in the inspection zone, as to which free droplet each particle of interest would most likely be in. The presence of the prediction creates the targeted and non-targeted designations for the sortable units. The system 10 then applies the appropriate surface charge to each droplet (as described below) just before breakoff to cause the droplet to deflect according to a sort logic for sorting the particles.

Upstream of the break-off point, the fluid stream 64 is continuous and the expected sortable fluid segments are constructs identified at the inspection zone 16 such that the fluid and contents of each expected sortable fluid segment is expected to correspond to a droplet downstream of the break-off point. Inaccuracies in the expected correspondence can arise because the expected sortable fluid segments must travel from the point of detection in the inspection zone 16 to the break-off point. The travel and break-off of the stream segments can depend upon random processes and upon operational parameters of the system and sort logic such as the drop delay time (which can be expressed in units of the droplet period for systems that produce droplets), the parameters of the drop drive signal 78, the nozzle height parameters, the position of the inspection zone parameters along the stream, and other parameters. The operational parameters can be controlled to improve the prediction as to which droplet will eventually contain a particle detected at the inspection zone 16.

In the example of FIGS. 1A and 1B, when a particle is identified in a targeted expected sortable fluid segment 101, the system predicts that it will be located in a targeted droplet 201 downstream of the break-off point. If the prediction is ultimately incorrect, the cause will likely be that the particle has "slipped" into an adjacent non-targeted droplet 203 that had been predicted to be empty or, at least, to not contain a particle of interest. By measuring adjacent non-targeted droplets 203 in the monitoring system 205, the accuracy of the initial prediction of particle location can be established and, if necessary, operational parameters of the system can be controlled to reduce the rate of incorrect predictions. By measuring adjacent non-targeted droplets 203 to calibrate the system in real-time, improvements can be realized in total sample recovery.

Once a particle 14, such as a stained particle, is delivered to the inspection zone 16, it may be interrogated with an electromagnetic radiation source 18. The electromagnetic radiation source 18 may be an arc lamp or a laser. As one non-limiting example, the electromagnetic radiation source 18 may be a pulsed laser emitting photons of radiation 52 at specified wavelengths. The wavelength of a pulsed laser may be selected based upon the particle characteristic of interest and may be selected to match an excitation wavelength of any stain or marker used to differentiate that characteristic. As a non-limiting example, a family of UV excitable dyes may be interrogated with a pulsed Vanguard Laser available from Newport Spectra-Physics and may have an emission wavelength of 355 nm and be operated at 175 mW.

Particles 14 at the inspection zone 16 may produce a secondary electromagnetic radiation in the form of emitted (fluoresced) or reflected (scattered) electromagnetic radiation 20 in response to the laser interrogation. The characteristics of the emitted or reflected electromagnetic radiation 20 may provide information relating to the characteristics of particles 14. The characteristics of the particles can determine whether the particle 14 is classified as a particle of interest that is to be sorted in a particular way (such as to a collection container to collect particles of interest). The intensity of the emitted or reflected electromagnetic radiation 20 may be quantified in a plurality of directions and/or at a plurality of specified wavelengths to provide a large amount of information about the interrogated particles. Alternatively or in addition to emitted and reflected light, light extinction or absorption can also be used to detect and identify particle characteristics that indicate the presence of a particle 14.

FIG. 1A illustrates detection system 22 that includes a first detector 128, sometimes referred to as at least one detector, configured to detect emitted or reflected electromagnetic radiation 20 from particles 14 in the inspection zone 16. The detection system 22 may include any number of detectors configured in one or more directions from the inspection zone 16. The first detector 128 and any additional detectors communicate signals to the processing unit 24 for differentiating particles and determining sort actions. As a non-limiting example, the first detector 128 may be configured in the forward direction, or in the same direction photons are propagated from the electromagnetic radiation source 18 toward the inspection zone 16. The first detector 128 may be a forward fluorescence detector including a filter for blocking any electromagnetic radiation below a certain wavelength. A plurality of detectors may be placed in a plurality of directions, including the rear, forward and/or side directions. Each direction may include an optical configuration of collection lenses, reflective elements, or objective lenses in combination with splitters, dichroic mirrors, filters and other optical elements for detecting the intensities of various wavelengths collected from any particular direction. Optical configurations may also be employed for detecting light extinction or light scatter.

A detector system 22 that is compatible with the present disclosure is described in U.S. Pat. No. 8,705,031, issued Apr. 22, 2014 and incorporated herein by reference in its entirety. The detector system 22 may include optical elements and filters and can include two detectors that view the fluid stream 64 from orthogonal directions.

Each detector 128 may be controlled with a PMT controller 140 for adjusting the gain in each detector 128. Signals produced by each detector may be amplified at the detector preamplifier 142 before being passed to the processing unit 24. Depending on the particle characteristics of interest, sensors other than PMTs may be employed, including but not limited to a photodiode, a charge coupled device (CCD), or an avalanche photodiode.

In some embodiments, the processing unit 24 may be a part of a personal desk top computer including all the acquisition and sort electronics 40 for operating the sort head 50 and the sorter 34 in response to signals produced by the detectors 128, 130. In another embodiment, the processing unit 24 may comprise a laptop with an external PCIe interface to the bus. The personal desk top computer or laptop may be an example computing device 151 described in greater detail below with respect to FIG. 8. The acquisition and sort electronics 40 may be implemented on a PCIe board 44 having a programmable processor. The programmable processor may be a field programmable gate array 26, such as the Spartan 3A, available from XILINX, San Jose, California US. Other field programmable gate arrays consisting of multiple thousands of configurable logic blocks may also be used. A field programmable gate array may be desirable as an implementation of a sort logic having configurable logic blocks which may operate asynchronously with a master clock. A field programmable gate array may further be desirable having configurable logic blocks with distributed RAM memory or without distributed RAM memory.

In combination with an amplifier unit 112, the processing unit 24 comprises a digital upgrade for some flow cytometer systems capable of replacing large racks including analog electronics. Specifically, the rack from an analog MoFlo™ (Beckman Coulter, formerly available from Cytomation) flow cytometer can be replaced with an amplifier unit 112 and a desk top computer having a PCIe board 44 with the field programmable gate array 26 (FPGA) described herein. The PCIe board 44 should be understood to include boards or cards having a PCIe interface 46.

The acquisition and sort electronics 40 or the PCIe board 44 may be connected through a common bus 48 in the desk top computer for displaying univariate histograms, bivariate plots and other graphical representations of acquired signals on a display for a graphical user interface 94 (GUI). Input devices may be associated with the GUI 94 such as a monitor, a touch screen monitor, a keyboard, or a mouse for controlling various aspects of the sort head 50 or sorter 34.

As will be described in more detail below, the PCIe board 44 with the FPGA 26 may operate to identify the occurrence of a pulse 23 in the signals produced by either the first detector 128 or the second detector 130 through the acquisition of signals and the execution of instructions on the PCIe board 44. Each detected pulse 23 may represent the presence of a particle 14 in the inspection zone 16 and may define an event, or a particle event. Generally, field programmable gate arrays contain thousands of programmable, interconnectable logic blocks. Embodiments of this disclosure comprise an FPGA performing parallel operations across programmed interconnected paths for performing one or more of the following functions: detecting pulses, calculating measured pulse parameters, translating measured pulse parameters; classifying particles; compiling event parameters; and making sort decisions. Programming architecture may be stored in individual configurable blocks or in combinations of configurable blocks, including configurable blocks with RAM and configurable blocks without RAM. Written instructions may be included on these configurable blocks and combinations of configurable blocks and may include bitmap look up tables (LUTs), state machines, and other programming architecture. In one aspect, written instructions stored on the FPGA may provide for constructing an event memory map tracking event parameters for each droplet, as well as tracking parameters for each event within each droplet.

The FPGA 26 may produce a number of control signals 116 to control the sort head 50. The control signals 116 may control operational parameters set by a user at the GUI 94 or may dynamically adjust parameters based on detected event parameters. The control signals 116 may include the drop drive signal 78 for controlling the oscillator 72 and a charge signal 92 for controlling the charge of the fluid stream 64 based upon a sort decision. The charge signal 92 is represented in FIG. 1A by the electrical connection for carrying the charge signal 92 from the processing unit 24 to an amplifier unit 112 and the electrical connection carrying the charge signal 92 from the amplifier unit 112 to a charge connection 127 in the nozzle assembly 62. The charge signal 92 carried from the amplifier unit 112 to a charge connection 127 in communication with the sheath fluid 56. An additional control signal 116 may include the strobe signal 120, represented by the electrical connection from the FPGA 26 to the amplifier unit 112, and from the amplifier unit 112 to the strobe 122.

The sort logic can determine how a sorter or separator 34 sorts each sortable unit based upon characteristics of the sortable unit. Suitable characteristics of the sortable unit that can form the basis for a sort decision include the presence or absence of particles of interest within the sortable unit and whether the sortable unit is adjacent in sequence to another sortable unit that includes a particle of interest (i.e., a particle having a pre-determined characteristic). In other words, the sort logic can base sort decisions on characteristics of the sortable unit itself, characteristics of sortable units prior in time or later in time, characteristics of particles within the sortable unit, or any combination of the above.

Once a sort decision is determined for a particular sortable unit, the fluid stream 64 may be charged with an appropriate charge just prior to the time a droplet 74 breaks off the fluid stream 64 encapsulating the particle 14. FIG. 1A illustrates several droplets 74 after break-off from the fluid stream (i.e., downstream of the breakoff point) but before separation in box 129. An expanded view of box 129 is provided to the right in FIG. 1A. As shown in box 129, the broken-off droplets 74 fall under gravity in a sequence. Targeted droplets 201 are droplets that are predicted to contain particles of interest when sorted. Adjacent non-targeted droplets 203a-d are particles that are predicted not to contain particles of interest, but that are adjacent in sequence to at least one of the targeted droplets 201a-c. Non-adjacent, non-targeted droplets 202a-b are predicted not to contain particles of interest and are not adjacent in sequence to at least one targeted droplet 201a-c. The adjacent non-targeted droplets 203a, 203b are located adjacent to targeted droplet 201a in sequence: adjacent non-targeted droplet 203a is after targeted droplet 201a while adjacent non-targeted droplet 203b is before the targeted droplet 201a. In some circumstances, multiple targeted droplets 201b, 201c can be adjacent in sequence to form a train. In this case, adjacent non-targeted droplets 203c, 203d can be identified that are before the first targeted droplet 201c in the train (i.e., adjacent non-targeted droplet 203d) and after the last targeted droplet 201b in the train (i.e., adjacent non-targeted droplet 203c).

As droplets fall, each droplet 74 may be subjected to an electromagnetic field produced by the separator 34 for physically separating particles 14 based upon a desired characteristic. In the case of a jet-in-air flow cytometer, the separator 34 may comprise deflection plates 114a, 114b. The deflection plates 114a, 114b may include high polar voltages for producing an electromagnetic field that acts on droplets 74 as they pass. The deflection plates 114 may be charged at up to ±3,000 Volts to deflect droplets 74 at high speeds into collection containers 126.

In some embodiments, the separator 34 can direct droplets 74 that are expected to include particles (i.e., targeted droplets 201) along a first pathway 77. The separator 34 can direct droplets that are not targeted but that are adjacent in sequence to targeted droplets (i.e., adjacent non-targeted droplets 203) along a second pathway 79. The separator 34 can direct droplets 74 that are not targeted and that are not adjacent in sequence to targeted droplets (i.e., non-adjacent non-targeted droplets 202) along a third pathway 81.

FIG. 1B illustrates an enlarged view of the separator 34, pathways 77, 79, 81, monitoring system 205, and collection containers 126 of FIG. 1A at a point in time after the particular expected sortable fluid segments 101, 102, 103 shown in FIG. 1A have formed into droplets 201, 202, 203 and have been separated by the separator 34 onto different pathways 77, 79, 81. Droplets 201a-c, 202a-b, 203a-d are shown that correspond to the droplets 201a-c, 202a-b, 203a-d illustrated in FIG. 1A. The monitoring system 205 interrogates adjacent non-targeted droplets 203 to monitor the presence or absence of particles of interest in the adjacent non-targeted droplets 203. Note that the adjacent non-targeted droplets 203 are not predicted to contain particles of interest (or they would be targeted droplets) but, nonetheless, the adjacent non-targeted droplet 203 may include particles of interest due to random fluidic processes of the system or because the operational parameters (such as sort delay) are set to sub-optimal values. By monitoring adjacent non-targeted droplets while simultaneously adjusting operational parameters to seek reduction or minimization of detected signal from the adjacent non-targeted droplets, the operational parameters can be optimized. By monitoring adjacent non-targeted droplets 203, which are a subset of the total number of droplets 202, 203 that are not targeted, the monitoring system 205 can operate in real time as the total number of droplets that are monitored is reduced and highly manageable. At the same time, the real-time operation does not sacrifice accuracy because mis-sorted particles are highly likely to be present in adjacent non-targeted droplets 203 rather than non-adjacent non-targeted droplets 202. In an active system, the drop delay is often incorrect by less than one droplet period (i.e., a fractional drop delay period). As a result, mis-sorted particles frequently appear either one droplet earlier or later in sequence. As such, measurement of non-adjacent non-targeted droplets 202 confounds the measurement of drop delay whereas measuring only adjacent non-targeted droplets 203 provides a highly sensitive measure of a fractional drop delay error. Additional insight as to why measurement of every non-targeted droplet (whether adjacent or not) does not lead to this sensitive result is described below with respect to FIGS. 5A-5B.

Adjacent non-targeted droplets 203 are droplets that immediately precede or follow droplets in sequence that are predicted to contain particles of interest (i.e., targeted droplets 201). Signals related to the presence or absence of particles of interest are received at the processing unit 24 from the monitoring system 205. The processing unit 24 is configured to adjust or calibrate operational parameters of the system, such as drop delay time, purity mask parameters such as mask width or mask position, or characteristics of the drop drive signal 78, based upon the received signals. By monitoring adjacent non-targeted droplets 203 using the monitoring system 205, the system 10 can monitor the success of a sorting operation in real time and adjust operational parameters of the system in real time to achieve target goals for purity, recovery, or other statistical properties of the sorted product.

The separator 34 diverts droplets 201, 202, 203 onto two or more output pathways 77, 79, 81. In some embodiments, targeted droplets 201 (that is, droplets anticipated to contain particles of interest) are directed along a first pathway 77. Adjacent non-targeted droplets 203 that are anticipated to contain no particles of interest, but that were adjacent in sequence as expected sortable fluid segments 103 to other expected sortable fluid segments 101 that contained particles, are directed along a second pathway 79. Non-adjacent, non-targeted droplets 202 that are anticipated to contain no particles of interest and that were not adjacent as expected sortable fluid segments 102 to other expected sortable fluid segments 101 that contained particles are directed along a third pathway 81. Although an example configuration is shown here, one of ordinary skill would appreciate that any pathway (e.g., diverted or non-diverted) can be assigned to any droplet classification as needed. For example, the targeted droplets 201 could be allowed to pass straight down (undeflected) while adjacent non-targeted droplets 203 are deflected to the left and non-adjacent non-targeted droplets 202 are deflected to the right.

The monitoring system 205 interrogates adjacent non-targeted droplets 203 downstream of the break-off point. In some embodiments, the interrogation can reveal if a particle of interest is located in the adjacent non-targeted droplet 203. In some embodiments, the processing unit 24 can adjust operational parameters of the system to minimize the signal from the monitoring system 205 associated with identification of particles of interest in adjacent non-targeted droplets 203.

The configuration shown in FIGS. 1A-1B applies to microfluidic systems of all forms and shapes including, but not limited to, jet-in-air and microfluidic chip/channel sorting systems as described in greater detail below with reference to FIG. 2.

Figure 2:
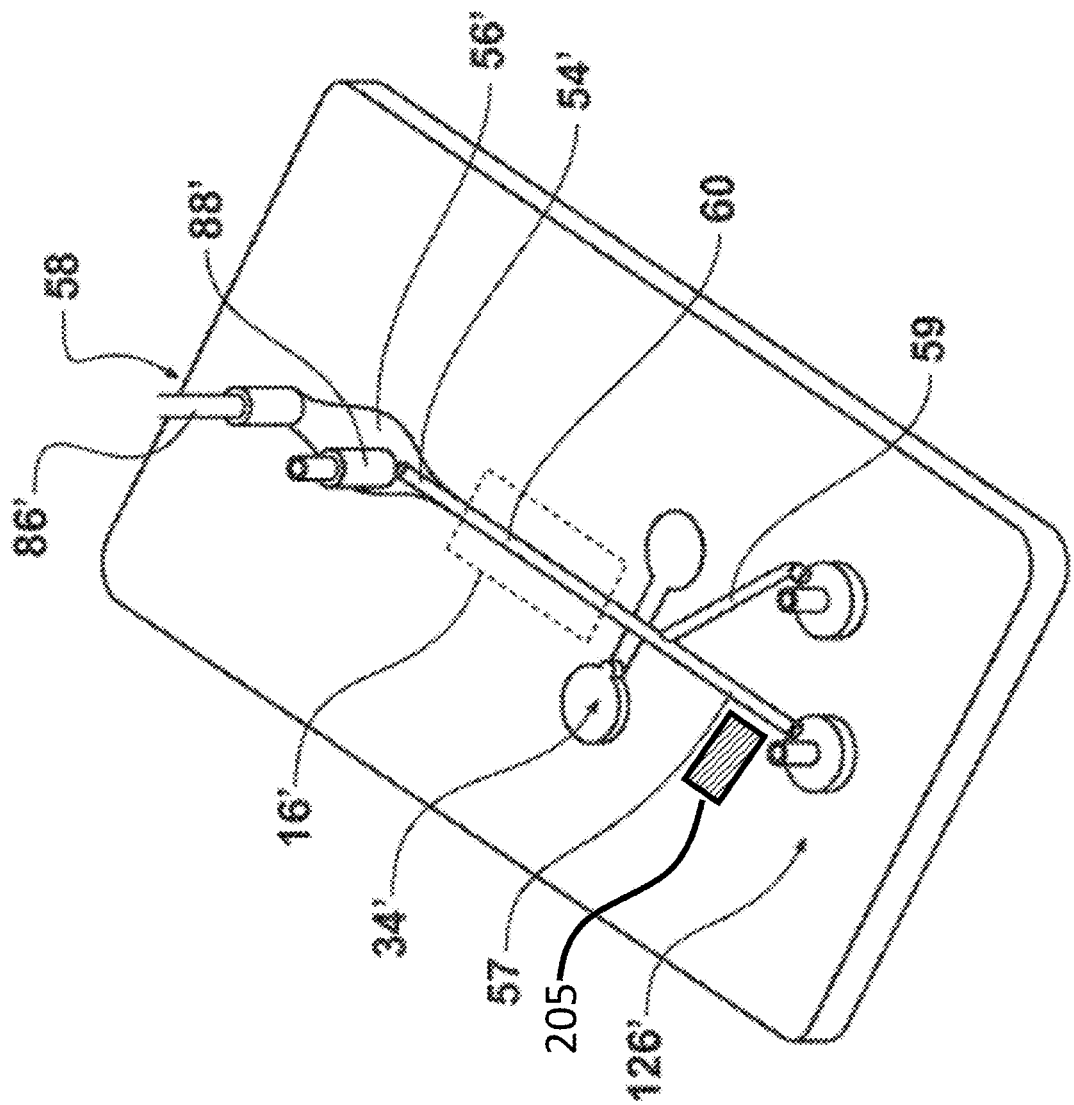
FIG. 2 illustrates an embodiment of a microfluidic chip operatively engaged with an example monitoring system as taught herein.

Referring to FIG. 2, a microfluidic chip 58 is illustrated that is operatively engaged with a monitoring system 205 according to some embodiments described herein. The microfluidic chip 58 includes a sorter 34' that sorts expected sortable fluid segments based on a characteristic of the expected sortable fluid segment onto a first flow path 57 or a second flow path 59. The particle delivery device may include a sample inlet 88' for introducing a sample 54' containing particles 14 into a fluid chamber 54' passing in a fluid stream 60 through an inspection zone 16'. The sample 54' may be insulated from interior channel walls and/or hydrodynamically focused with a sheath fluid 56' introduced through a sheath inlet 86'. After inspection at the inspection zone 16' using a measurement system similar to the one described with respect to FIG. 1A, expected sortable fluid segments that include particles of interest 14 in the fluid chamber 54' can be determined. Sortable fluid segments that correspond to the expected sortable fluid segments can be mechanically or acoustically directed to the second flow path 59 using the sorter 34', which is analogous in function to the separator 34 described above in relation to FIGS. 1A and 1B. Adjacent non-targeted sortable fluid segments and non-adjacent non-targeted sortable fluid segments can be diverted or can flow naturally along the first flow path 57.

The monitoring system 205 advantageously provides an empirical method to assess optimal switch timing under actual sorting conditions using actual particles of interest.

By switching a sortable fluid volume that is expected to have no particles of interest, but that is adjacent to a sortable fluid volume that is expected to contain particles of interest, the user can determine for the specific sample being sorted what the correct and shortest effective switching times between switch periods can be. Factors such as particle size and drag can impact the inter-switching period (which may also be referred to as the switch recovery period). Using the monitoring system 205, the user can not only determine the delay timing needed to switch particles of interest in the microfluidic chip 58 but also assess how quickly the next switch actuation can occur (as it may take a finite amount of time to restore normal flow after a switch actuation). Thus, the user can assess the "emptiness" of switched anticipated empty fluid volumes that are adjacent to anticipated occupied fluid volumes.

Although not shown in FIG. 2, some microfluidic chips may also include a third flow path, which can be located opposite the second flow path 59. In such an embodiment, the sorter 34' can direct non-adjacent non-targeted sortable fluid segments along the third flow path. The sorter 34' may alter fluid pressure or divert fluid flow to selectively direct targeted sortable fluid segments from the fluid stream along either the first flow path 57 or the second flow path 59. For example, the sorter 34' can include a membrane in some embodiments which, when depressed, may cause a pressure pulse to divert targeted sortable fluid segments into the second flow path 59. Other mechanical or electro-mechanical switching means such as transducers and switches may also be used to divert particle flow. The sortable units can pass to collection containers 126', which can include sealed wells or voids on chip to collect the sortable units or can include sealable output ports that transport the targeted sortable fluid segments off chip.

The point at which the particles 14 are directed to one of the flow paths in this embodiment is analogous to the break-off point in the embodiment of FIGS. 1A-1B because the particles 14 take some time to travel from the inspection zone 16' to the point at which the sorter 34' acts upon the sortable fluid segment.

The sorter 34' can sort targeted sortable fluid segments along the second flow path 59 and adjacent non-targeted sortable fluid segments along the first flow path 57. The monitoring system 205 can monitor adjacent non-targeted sortable fluid segments that are directed along the first flow path 57. For example, the monitoring system 205 can include an electromagnetic source and detector positioned on opposite sides of the microfluidic chip 58 to view light emanating from within the first sort path 57. In some embodiments, the monitoring system 205 can be operatively connected with an electronic gate system that enables the monitoring system 205 to provide signals that are gated to time periods when the adjacent non-targeted sortable fluid segments are passing the view of the monitoring device 205 along the first flow path 57. The electronic gate system enables the monitoring system 205 to reject measurements that are obtained during times when adjacent non-targeted sortable fluid segments are not passing the view of the monitoring system 205, e.g., at times when non-adjacent sortable fluid segments are passing the view of the monitoring system 205. In embodiments that have a third flow path onto which the sorter 34' directs adjacent non-targeted sortable fluid segments, the monitoring system 34' can monitor primarily or only those sortable fluid segments that qualify as adjacent non-targeted sortable fluid segments. Signals from the monitoring system 205 can be used to adjust an operational parameter of the system such as sort delay.

Figure 3C:
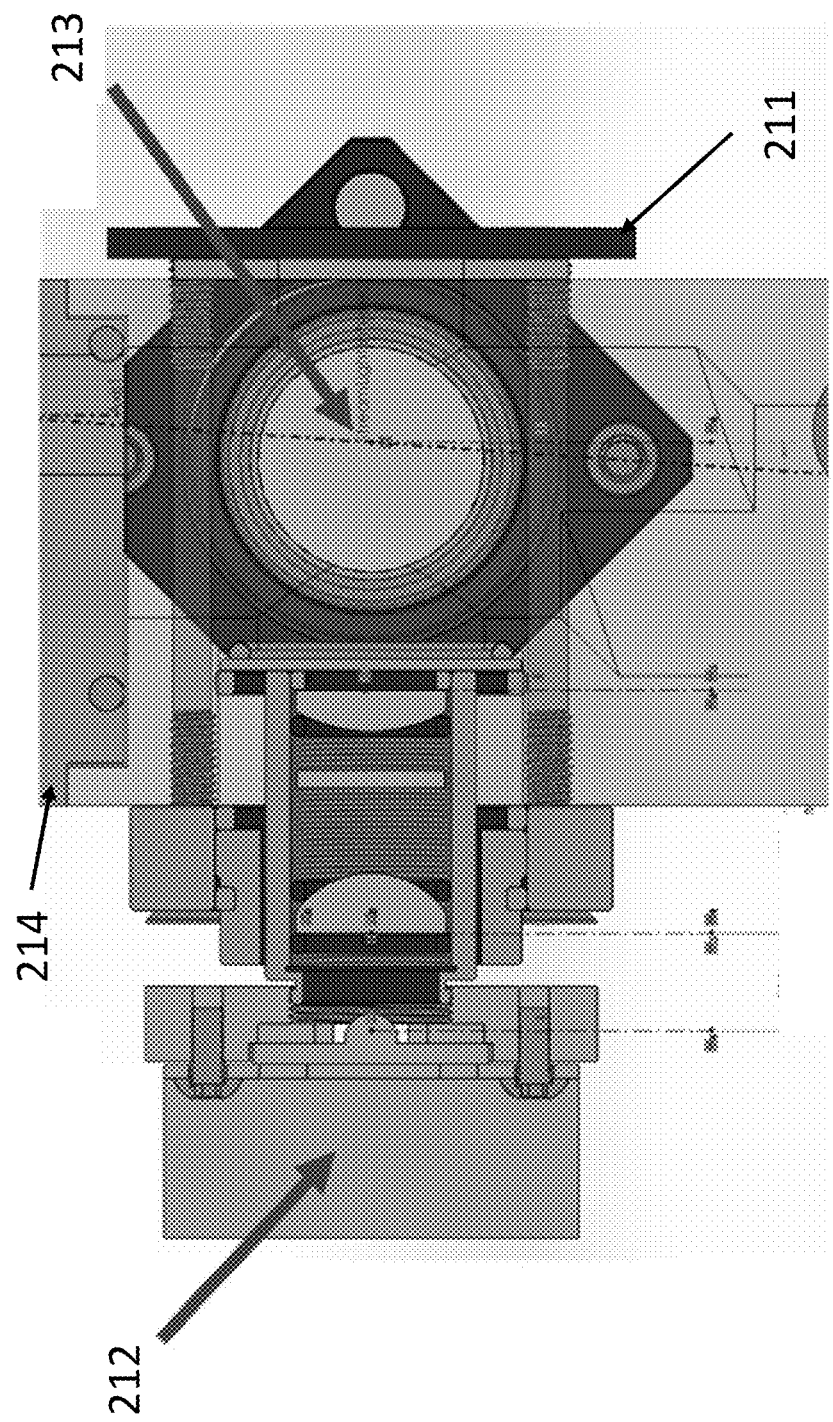

FIGS. 3A and 3B depict views of the monitoring system 205 in accordance with various embodiments described herein. FIG. 3C illustrates a top view of the monitoring system 205. In some embodiments, the monitoring system 205 can include an electromagnetic radiation source 212 and a detector 214. The monitoring system 205 shown in FIGS. 3A and 3B is configured to monitor adjacent non-targeted droplets 203 in air and includes a housing 211 through which the droplets pass. The housing 211 can include an opening 213 through which the adjacent non-targeted droplets 203 enter the housing 211. Droplets can be captured in the housing 211 or can pass out of the housing 211 to be disposed of or captured elsewhere, for example, in a collection container 126 as shown in FIGS. 1A and 1B. In some embodiments, the housing 211 can include one or more holders 215 for collection containers 126 to hold a collection container 126 in place where each collection container 126 is associated with a different flow path 77, 79, 81. The holder 215 can hold a collection container 126 to enable removal of the collection contain 126 from the holder 215 and insertion of the collection container 126 into the holder 215. Other forms of monitoring system 205 are contemplated in this disclosure that monitor adjacent non-targeted droplets 203 in the microfluidic chip context and may not include a separate housing 211.

The electromagnetic radiation source 212 can illuminate each adjacent non-targeted droplet 203 to identify the presence or absence of one or more particles in each adjacent non-targeted droplet 203. For example, the electromagnetic radiation source 212 can include one or more light emitting diodes. The light emitting diodes can emit light in the ultraviolet range, for example, at a center wavelength of 365 nm. In some embodiments, the electromagnetic radiation source 212 can include a heat sink to dissipate heat generated during light emission. In some embodiments, the electromagnetic radiation source 212 can illuminate a large volume within the housing 211 through which the adjacent non-targeted droplets 203 pass from top to bottom. For example, the large volume can have a diameter of about 5 mm in some embodiments. The detector 214 collects light from this large illuminated volume. For example, the detector 214 can include a charge-coupled device (CCD), a photodiode, or other imaging device that detects the illumination light. Optical filters can be used in some embodiments to narrow the illumination wavelength band, to filter the emission received at the detector 214, or both. In some embodiments, optical filters can include bandpass filters that narrow the illumination wavelength band to a range of approximately 350 nm+/−10 nm or 376 nm+/−30 nm. The optical filters can include neutral density filters such as optical density (OD) 4 filters. In some embodiments, the optical filters can include shortpass filters. In some embodiments, optical filters such as bandpass filters can be used to narrow the emission wavelength band received at the detector 214 to a range of approximately 415 to 550 nm. In some embodiments, the optical filters can include longpass filters with a cutoff wavelength of 410 nm. The optical filters can include neutral density filters such as OD 4 filters. The detector 214 can also interface with other optical elements such as lenses or mirrors.

In some embodiments, the field of view of the detector 214 (with or without other optical elements) is large compared to the size of individual droplets 203. In some cases, five or more adjacent non-targeted droplets 203 may be within the field of view of the detector 214 at any time. In some embodiments, the detector 214 reads out at a rate of 30 Hz. For example, the detector 214 can include CCD elements that charge for $\frac{1}{30}^{th}$ of a second (i.e., the detector 214 has a frame rate of 30 frames/second), which can essentially integrate the total emission within the field of view of the detector 214 for each time period. The sum of the values of all pixels for a single frame is called the frame count. The detector 214 can output a signal (e.g., a frame count) representative of the total emission to the processing unit 24 that is also controlling the sort delay and other operating parameters of the particle sorter. In some embodiments, a high value for the frame count is an indication that the intensity of light received at the detector 214 is high which may mean that particles of interest were located in the measured adjacent non-targeted droplets 203.

Figure 5A:
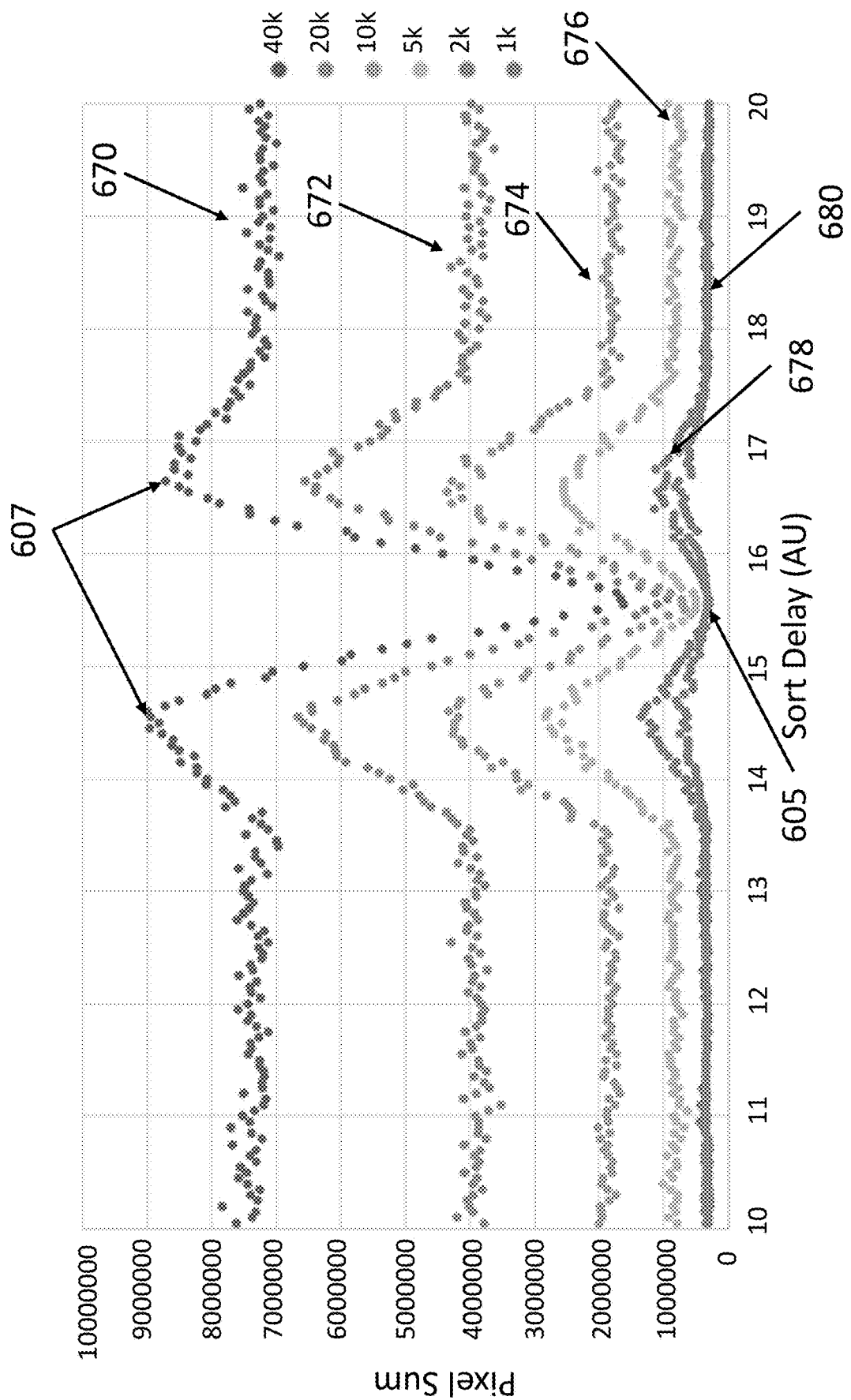
FIG. 5A graphically illustrates measurement data received from an example monitoring system as taught herein.
Figure 5B:
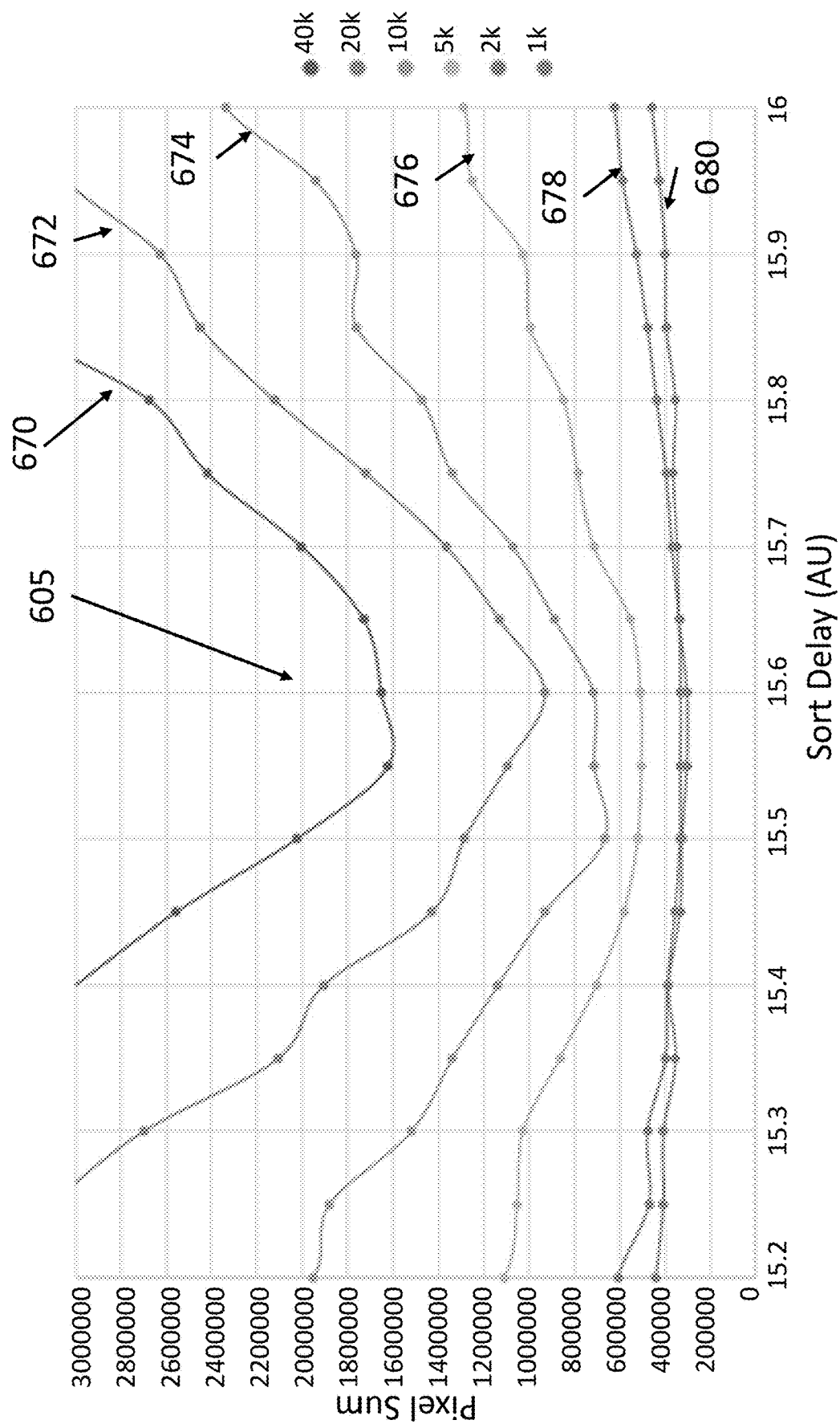
FIG. 5B is a magnified portion of FIG. 5A centered around the minima of the depicted curves.

The processing unit 24 can generate what is referred to herein as an "intensity measurement" based upon one or more signals received from the detector 214. Generally, the intensity measurement can be based on an average or cumulative measurement from multiple frame counts. For example, the processing unit 24 can collect n frame counts at a particular value of sort delay. In some embodiments, the processing unit 24 can process the n frame counts to remove outlier frame counts (e.g., the highest and lowest frame counts in the set of n frame counts). The remaining frame counts can be averaged to become the intensity measurement. The data plotted in FIGS. 5A, 5B, and 6B are intensity measurements as described herein. In some embodiments, the number of frame counts n that are averaged for a particular value of sort delay can be between 5 and 10.

The system including processing unit 24 can maintain the proper phase of the droplet break off during calibration or active sample sorting. In some embodiments, the housing 211 can include a holder to hold collection containers 126 for one or more sorting pathways 77, 79, 81. For example, FIG. 3A shows a collection container 126 mounted in a holder opposite the opening 213 in the housing 211 of the monitoring device 205. In some embodiments, targeted droplets 201 can be directed into the collection container 126 while calibration measurements are underway.

Cells or particles that pass largely in single file, after hydrodynamic focusing, through a flow cytometer or cell sorter are physically separated at random, Poisson-distributed, intervals. Because droplets 201, 202, 203 are formed synchronously by the nozzle assembly 62 and particles 14 arrive asynchronously at random intervals, it is possible to apply Poisson probability to calculate the probability of k particles arriving during a single droplet period as follows:

$$P(k \text{ events in interval}) = \frac{\lambda^k e^{-\lambda}}{k!}$$

Importantly, this equation can be used to predict what fraction of droplets 201, 202, 203 can be expected to contain no particles based on the stream velocity, average rate of particle arrival, and droplet generation frequency. Therefore it is possible to operate the separator 34 at a wide range of predictable operating points where a predictable fraction of the droplets will contain zero particles. It is possible to use the Poisson probability equation to predict the number of droplets that can be expected to be empty for any operating point.

Figure 4A:
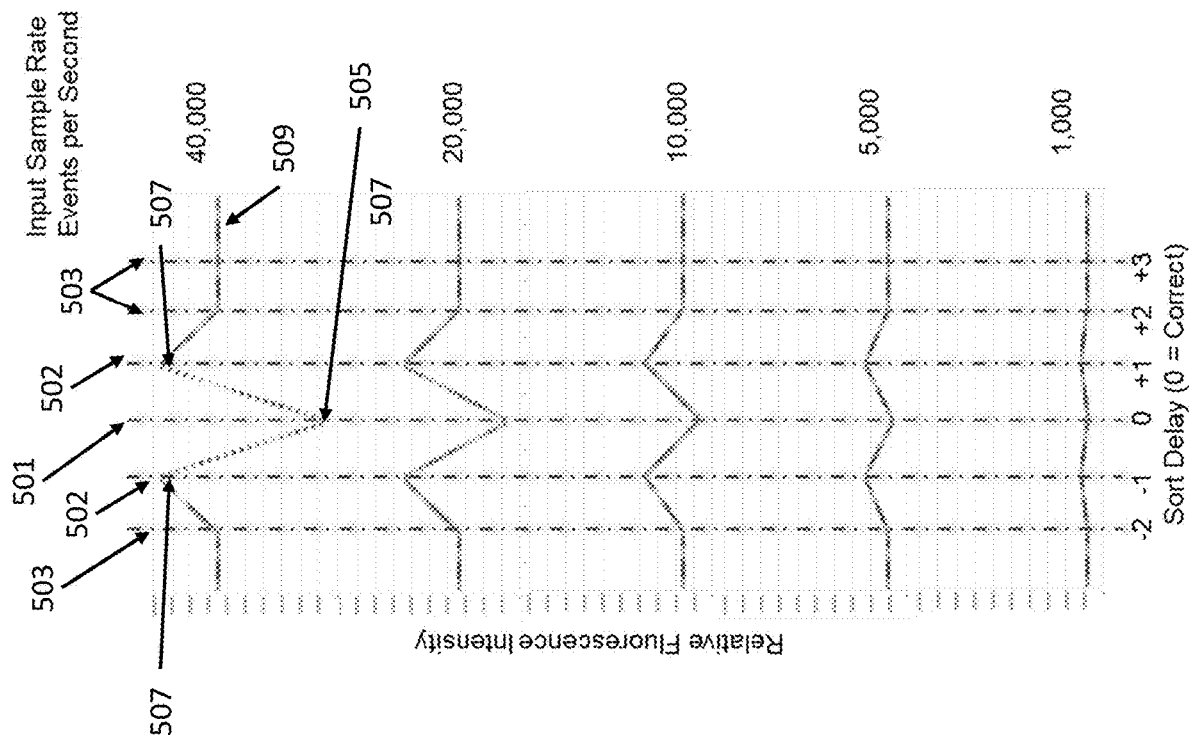
FIG. 4A illustrates simulation data modeling an output of an example monitoring system as taught herein.

Systems and methods of the present disclosure can use signals from the monitoring system 205 to calibrate or adjust operational parameters of the system. Adjustable operational parameters in various embodiments can include nozzle height, laser beam vertical position, amplitude of the drop drive signal provided to the drive transducer, and other parameters. For example, the signals from the monitoring system 205 can be used to calibrate or adjust a sort delay parameter. FIG. 4A illustrates simulated results for fluorescence intensity measured at the example monitoring system 205 as a function of sort delay for several input sample rates. Relevant inputs and outputs for this simulation are listed in tabular form in FIG. 4B. The simulation accounts for multiple cells per drop due to Poisson probability. At an input sample rate of 40,000 particles per second and a droplet generation frequency of 65 kHz, 46.14% of all droplets in the simulation contain particles (29,990 per second) while there are 25,338 adjacent non-targeted droplets per second and around 9,600 non-targeted droplets that were not adjacent to a targeted droplet. In the simulation, the detector 214 operates at 30 frames per second and an output signal from the detector 214 to the processing unit 24 includes an integration of pixel counts over 5 frames.

The simulation was run for several input sample rates. In FIG. 4A, the horizontal axis is the relative sort delay value where a relative sort delay=0 is the absolute proper sort delay setting as indicated by line 501. The two neighboring dotted lines 502 are positioned at +1 and −1 from the proper sort delay setting. The other dotted lines 503 are positioned at +2, +3, and −2 from the proper sort delay setting. The whole number values used in this figure represent period multipliers of the formation time of a droplet. A relative sort delay of +1 or −1 (lines 502) represents the situation where the sort delay setting is off by one full period such that a detected particle is sorted into the droplet immediately before or after the droplet that is expected to contain the particle.

As indicated on the curve representing the 40,000 events per second (eps) input sample rate, one can see that the lowest intensity point 505 is a clear feature and that this point 505 marks the proper sort delay setting at line 501. One can also see that maximum intensity peaks 507 occur at +1 and −1 relative sort delay (lines 502). Each maximum intensity peak occurs where there is an error in timing by one full period, so that the likelihood is high that the adjacent droplet contains the particle, which is then detected, for example, as high fluorescence intensity detected by the monitoring device 205. Similar maximum and minimum intensity points are seen on the other curves in the figure.

When the relative sort delay is greater than +1 or less than −1, the curve approaches a flat background value 509. This background value represents the average fluorescence for sortable units selected randomly from the stream and depends on the overall cell rate and particle fluorescence intensity. The background value therefore varies from sample to sample. The background value remains roughly constant as relative sort delay moves further away from zero.

By generating a curve such as that shown in FIG. 4A, the processing unit 24 can determine the minimum intensity point on this curve and the corresponding proper sort delay value. The corresponding sort delay value represents the proper set point for sort delay. The simulation suggests that higher event rates produce more pronounced curve minima, which should be easier to detect. In some embodiments, the system can measure events at a sample sorting rate in a range from 5,000 events per second (eps) to 40,000 eps. The approach to determining the appropriate sort delay value is described in greater detail below.

Curves such as those shown in FIG. 4A and FIGS. 5A and 6, which are discussed below, cannot be realized in a system that monitors all expected empty droplets including both adjacent and non-adjacent droplets. The particular characteristics of the curve including minima and maxima around a baseline are present because only adjacent droplets are monitored. In the event that all expected empty (i.e., non-targeted) droplets are monitored, the shape of the curve as the value of sort delay is swept is largely dominated by random noise around the baseline as particles are measured in non-targeted droplets that are completely uncorrelated to any particular sort decision. For example, using the monitoring device to measure all non-targeted droplets (i.e., all droplets predicted to lack particles of interest without regard to whether the droplet was adjacent to a targeted droplet) would mean that the peaks 507 in FIG. 4A and 602 in FIG. 5A would not exist. In such a case, the baseline level 509 would raise to approximately the level of the maximum intensity points 507 because essentially all particles would be seen at all delay values. In some embodiments, the obvious signature of the background 509 (based on random sampling of drops, which is low), the peaks 507 (which identify the +/−1 drop boundary) and the minimum 505 (which identifies the correct delay setting) improves identification of system issues and proper calibration values. In particular, the overall shape of the curve can provide an important diagnostic for the system. For example, if only one of the peaks 507 is present, the performance of the calibration system is suspect. Thus, the measurement of only adjacent non-targeted droplets increases sensitivity while also providing self-calibration and self-quality control capabilities to the system.

FIG. 5A illustrates data curves of intensity measurement data as a function of sort delay value obtained using the system 10 to measure Hoechst-stained sperm cells and nuclei in accordance with the present disclosure. FIG. 5B is a magnified view of a portion of FIG. 5A. Data in the figures was obtained at sample input rates ranging from 1000 events per second (eps) to 40,000 eps, which are essentially the same input rates shown in the simulations of FIG. 4A. From highest to lowest background value, FIGS. 5A and 5B show curves acquired at 40k eps (curve 670), 20k eps (curve 672), 10k eps (curve 674), 5k eps (curve 676), 2k eps (curve 678), and 1k eps (curve 680). The actual measured curves in FIGS. 5A and 5B show strong agreement with the simulated curves of FIG. 4A, particularly in terms of showing the steep intensity rises at +1 and −1 relative sort delay producing peaks 602 that bracket a curve minimum 605 value at the proper sort delay value.

FIG. 5B illustrates a magnified view of FIG. 5A near the minimum intensity value 605 for each of the event rates. The minimum 605 is well defined and similar to what was predicted by the simulation.

Figure 6A:
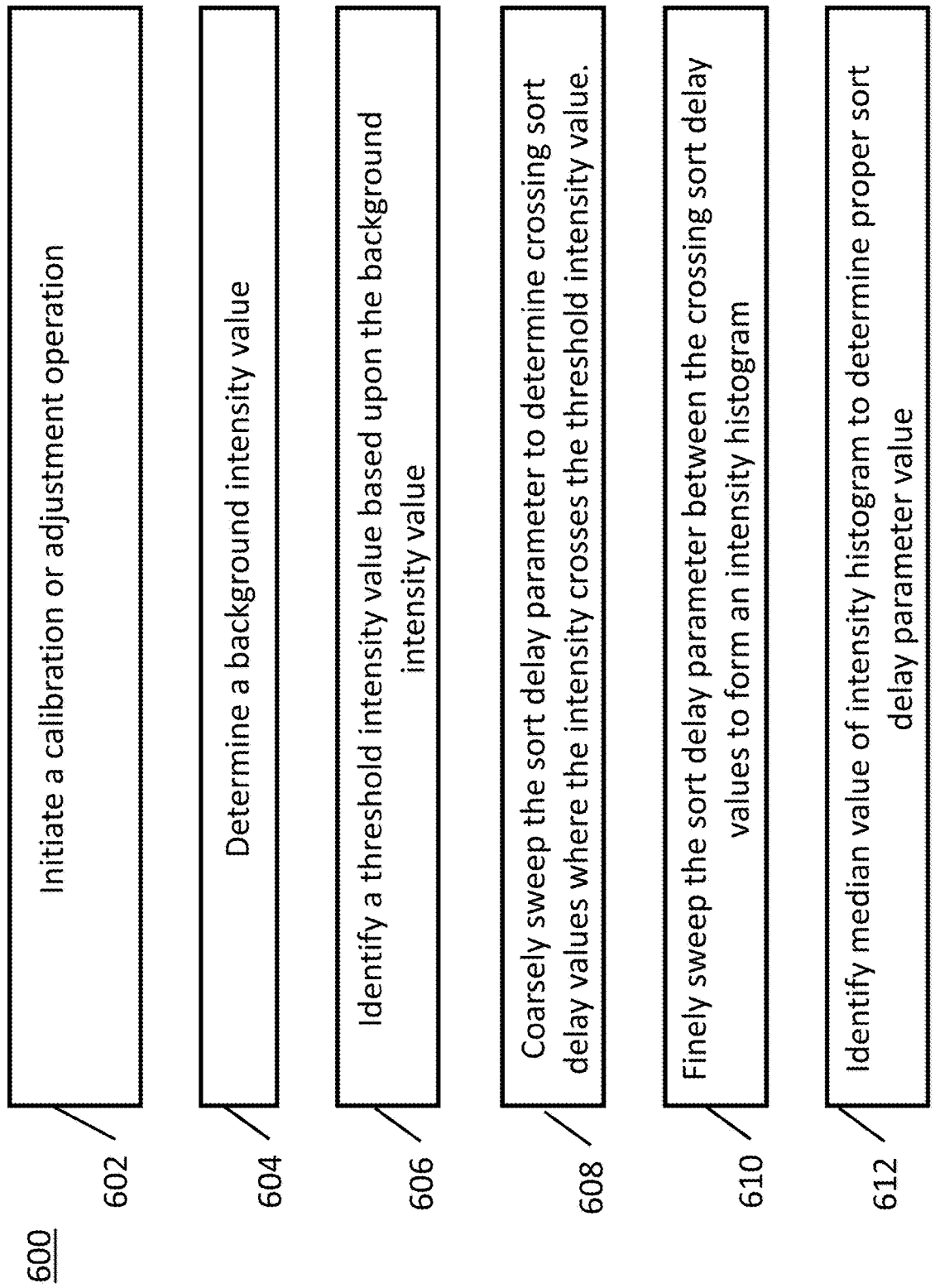
FIG. 6A illustrates a process for adjusting sort delay using data from an example monitoring system as taught herein.
Figure 6B:
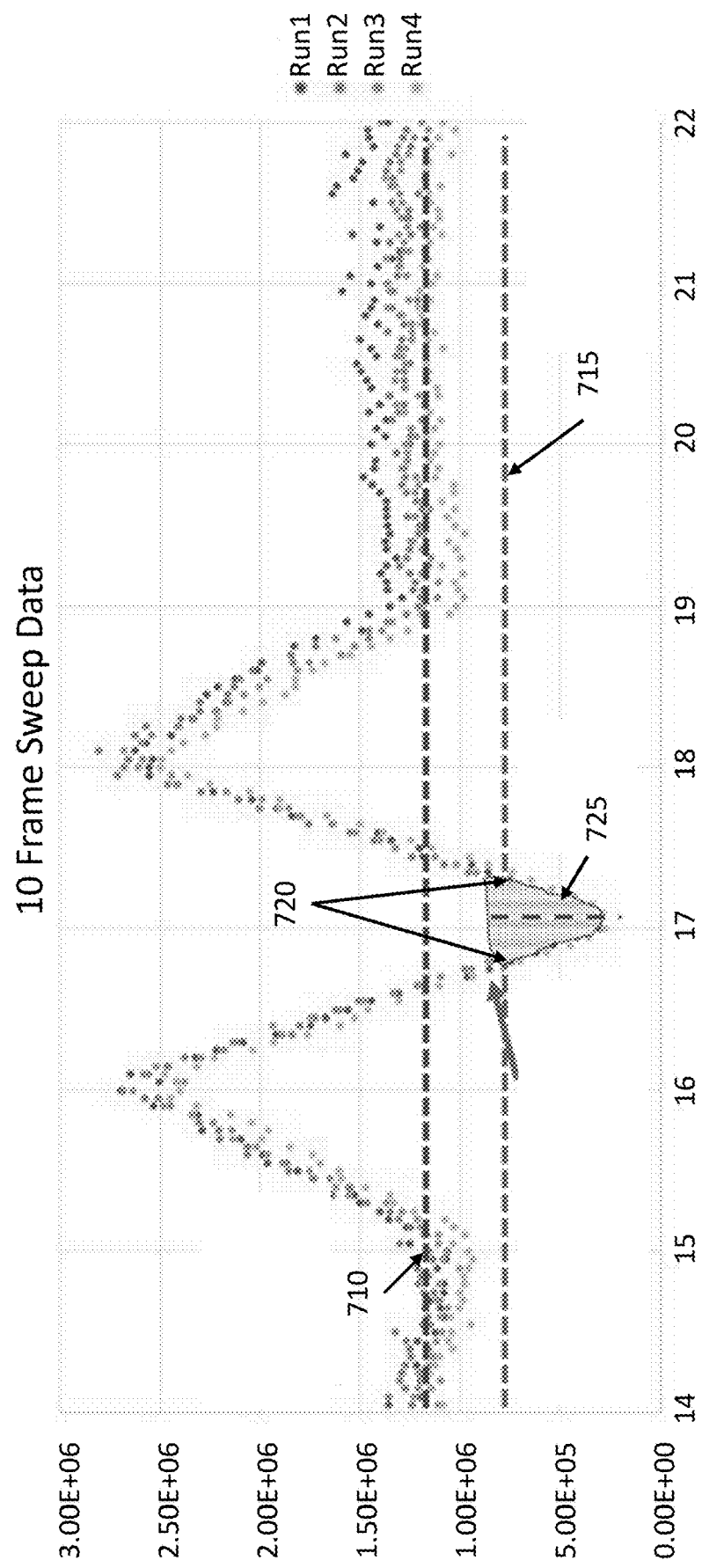
FIG. 6B graphically illustrates several steps of the process shown in FIG. 6A.

FIG. 6A illustrates a process 600 for adjusting sort delay using data from the monitoring system 205 as described herein. FIG. 6B is also provided to help graphically illustrate steps of the process. In some embodiments, one or more steps in the process 600 can be implemented as a computer application such as the sort monitor calibration application 940 of FIG. 8. As an initial step, the system can initiate a calibration or adjustment operation (step 602). Alternatively, as an initial step the system can start sorting based on a prior calibration. For example, a user can initiate the calibration or adjustment process through interaction with the processing unit 24 such as by pressing a button on a graphical user interface displayed by the processing unit 24 on a touch-screen monitor. Alternatively, the system itself can initiate the calibration operation based upon a triggering event. The triggering event could be detection of an out-of-bounds statistical value of the sample (e.g., detection that purity has fallen below a threshold) or could be based on a time (i.e., calibration occurs on a set schedule or after a certain amount of active operation time has passed since the last calibration). The processing unit 24 can first determine the background intensity value 710 (step 604) by setting the sort delay to a value far from the last-known or expected proper sort delay value. The background intensity value represents the average value of intensity measurements for sort delay values that are significantly greater or less than the proper sort delay value (e.g., more than 2 periods away from the proper sort delay value). In other terms, the background is a mean value that represents the background (or random sampling of droplet fluorescence) at the current operating point. In some embodiments, the background intensity value 710 can be an average intensity measurement value from at least 10,000 droplets. The background value can be measured immediately before the process of adjustment of operational parameters is begun. At such values of sort delay, the connection between the detection and sorting operations becomes nearly completely uncorrelated and, thus, random, which establishes the background value 710 because the monitoring system 205 is sampling random droplets out of phase with the sorting system.

Next, the processing unit 24 identifies a threshold intensity value 715 based upon the background intensity value 710 (step 606). For example, the threshold intensity value 715 can be a percentage of the background intensity value 710 such as 70%. The processing unit 24 can sweep the value of sort delay until the intensity value falls below the threshold intensity value 715. This may be done initially using coarse increments to the value of sort delay. For example, coarse increments of sort delay can be in a range from 0.1 to 0.5 times the period of the droplet generation signal. If the search is done with an increment greater than 0.5 times the period of the droplet signal, it is possible to miss (i.e., skip over) detection of the signal dip. The coarse increment of sort delay can be 0.25 times the period of the droplet generation signal in some embodiments. The processing unit can determine crossing sort delay values 720 where the intensity value crosses the threshold intensity value 715 (step 608). Then, the processing unit can do a sweep of sort delay using fine increments between the crossing sort delay values 720 to form a histogram 725 of intensity values (step 610). For example, fine increments of sort delay can be in a range from 0.01 to 0.1 times the period of the droplet generation signal. In some embodiments, the fine increment of sort delay can be 0.05 or 0.02 times the period of the droplet generation signal. In some embodiments, the fine increment of sort delay can be limited to the maximum timing resolution of the system. The processing unit can identify a median value of the histogram 725 (step 612). The median value of the histogram 725 is the proper value of sort delay.

Figure 7:
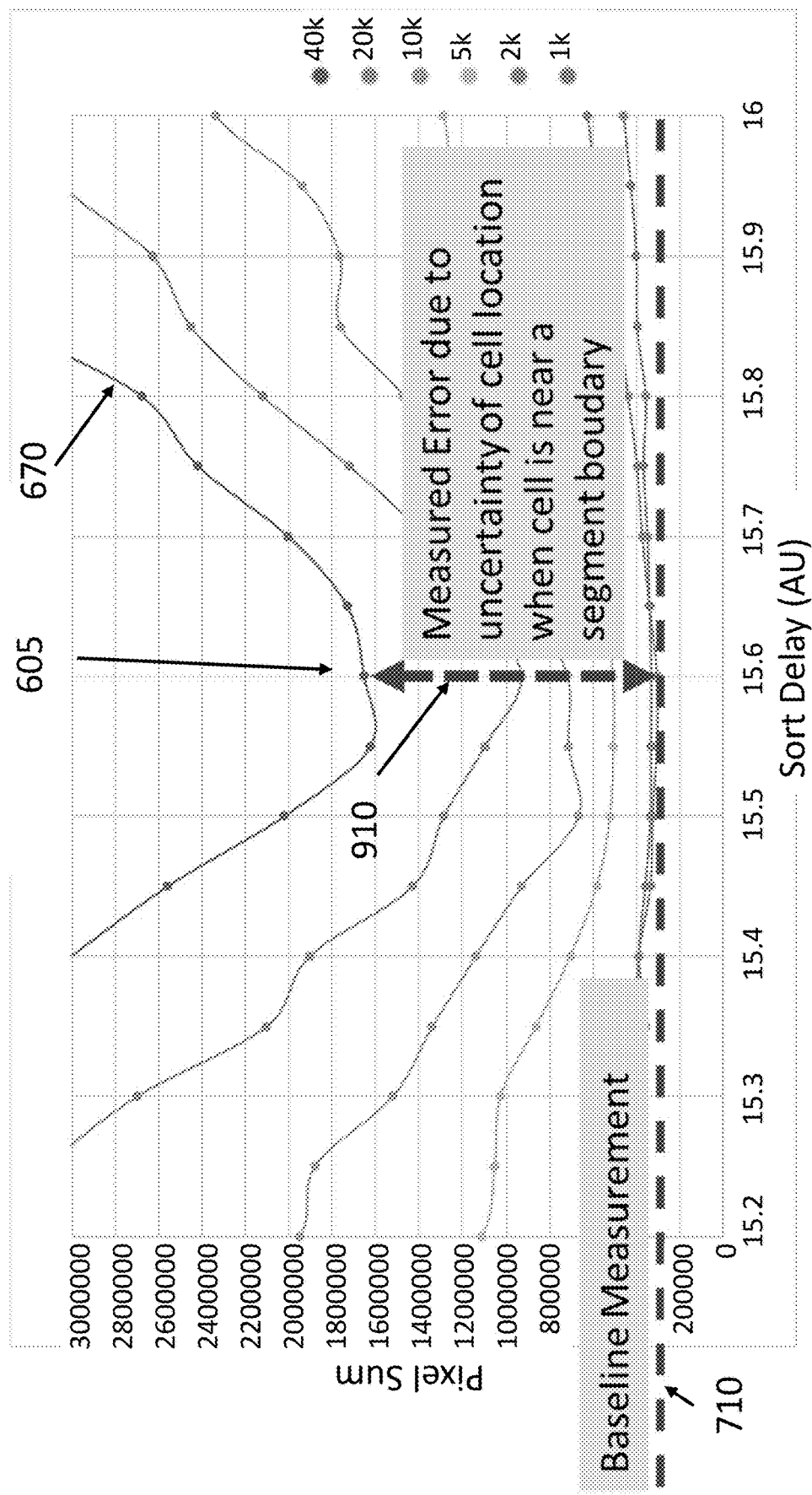
FIG. 7 graphically illustrates data measurements for adjustment or verification of a sorting mask using an example monitoring system as taught herein.

In some embodiments taught herein, systems and methods can use signals from the monitoring device 205 to improve statistical sort outcomes such as purity, throughput, or recovery. For example, the signals can be used to adjust operational parameters of a purity mask (e.g., mask width or position), sample rate, or other parameters to provide an output purity that exceeds a defined threshold. FIG. 7 illustrates measured intensity in the monitoring device 205 as a function of sort delay with an identification of error 910 measured over baseline. The monitoring device 205 can be used to compare the number of adjacent non-targeted droplets 203 that should theoretically be observed vs. the number of adjacent non-targeted droplets 203 that are actually devoid of particles of interest. The discrepancy between these quantities arises due to the uncertainty in membership of particles to expected droplets for particles that are located near the boundary between stream segments. In the example show in FIG. 7, the error 910 is illustrated for the 40k eps curve 670. For curves having a minimum 605 above the baseline or background intensity value 710, the error 910 is non-zero and is directly related to the number of particles that "slipped" through due to various random processes. The size of the error 910 can be manipulated (e.g., reduced) by tuning various operating parameters of the system. For example, increasing overall droplet drive, reducing overall delay, reducing sample rate, and pushing droplets closer to the nozzle will reduce error 910. In some embodiments, the size of the error 910 is predictive of the achievable purity under current operating conditions.

In some embodiments, a window or mask can be defined on the expected sortable fluid segments such that the sort logic aborts sorting of sortable units where particles are too close to the leading or trailing boundary of the expected sortable fluid segment. Specifically, the droplets with ambiguous particle location will not be sorted to output pathway 77 corresponding to targeted particle droplets 201 in FIG. 1B. To enable automated adjustment of sort windows and mask widths within the sort logic, adjacent non-targeted droplets 203 that are measured by the monitoring system 205 can be required to be adjacent to targeted droplets 201 that are actually sorted (as opposed to targeted droplets that are not sorted because they were rejected by the sort logic using the purity mask). Under this condition, output signals from the monitoring system 205 can be used to assess the efficiency of such a purity window or mask by, for example, comparing the size of the error 910 when the sort logic is employing the mask to the size of the error 910 when the sort logic is not employing a mask. This can allow real time or automated adjustment of these window or mask widths based on feedback from the apparatus. This enables optimal purity and optimal recovery at that purity. Automation allows for the dynamic adjustment of these windows or masks in real time to accommodate changes in sample characteristics that may impact this error.

At higher event rates, the number of particles assigned to incorrect droplets may increase. This measured error shown in FIG. 7 is a direct measurement of particles that were registered at measurement as being in a particular expected sortable fluid segment but that actually slip into an adjacent non-targeted droplet 203 and are measured by the monitoring system 205. By applying a sort window or sort mask in the sort logic, it is possible to abort the sorting of targeted droplets where particles are near a boundary between stream segments. Thus, the monitoring system 205 can be used to assess how well such a sort window or sort mask is working, allowing real-time tuning of the parameters of the mask such as width or position relative to expected boundaries between expected sortable fluid segments. In the event that the errors are eliminated, the minima 605 for each curve in FIG. 7 drops to the baseline 710 (i.e., the error 910 is zero).

Figure 8:
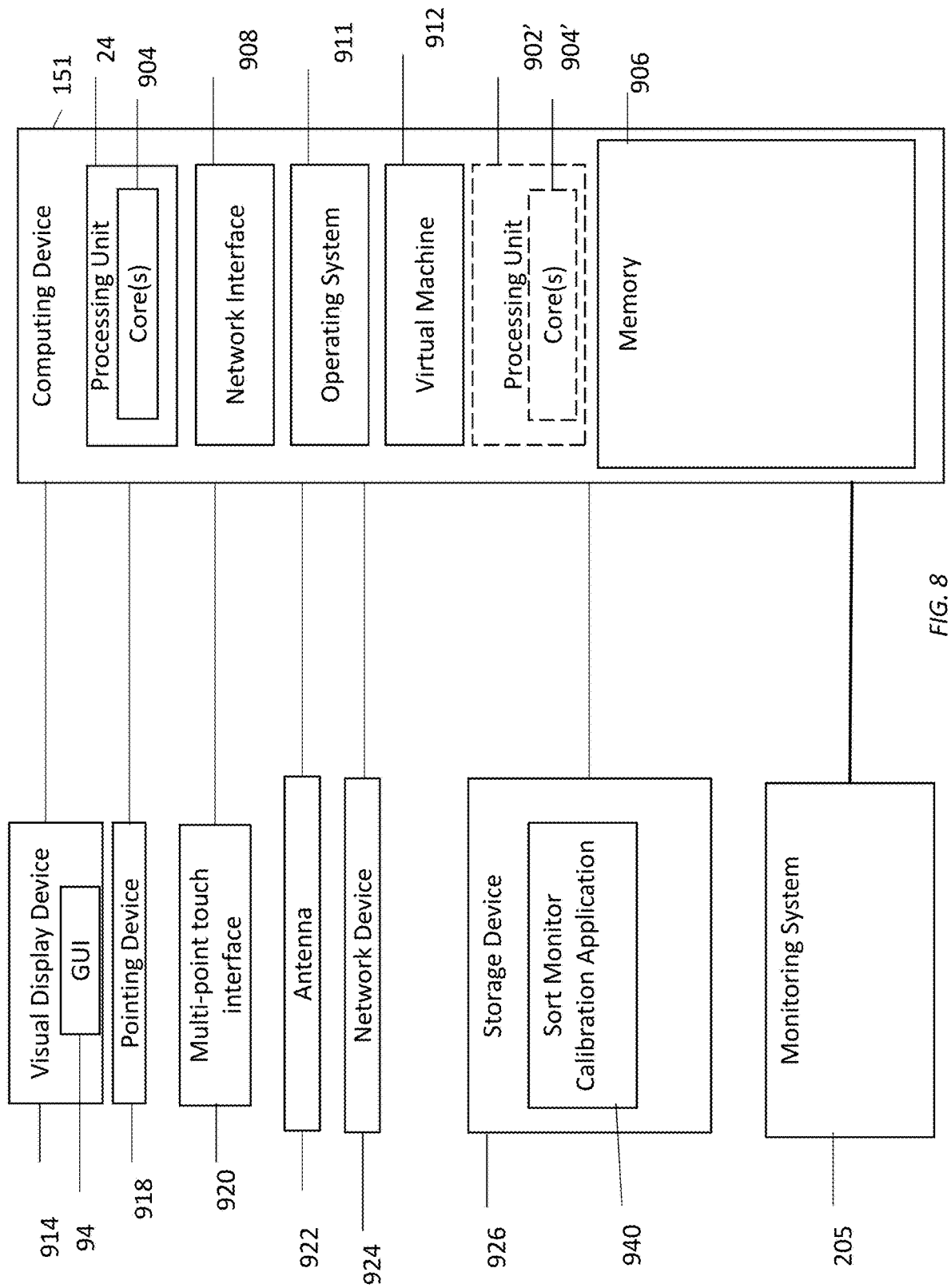
FIG. 8 illustrates an example computing device including a processing unit for implementing some aspects of the systems and methods taught herein in various embodiments.

FIG. 8 is a block diagram of a computing device 151 for implementing some embodiments of the present disclosure. The computing device 151 includes one or more non-transitory computer-readable media for storing one or more computer-executable instructions or software modules for implementing some embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. The memory 906 included in the computing device 151 or the storage device 926 included in or connected to the computing device 151 may store computer-readable and computer-executable instructions or software for implementing operations of the computing device 151 or processing unit 24 described herein. For example, the software can analyze signals received from the detector, alter the sort logic, implement the sort logic, or other operations as taught above. The software can include the sort monitor calibration application 940 that includes instructions to carry out operation of the system 100 to execute the methodology of adjusting operational parameters and data analysis described above with respect to FIGS. 4A, 4B, 5A, 5B, 6A, 6B, and 7. The software instructions in the sort monitor calibration application 640 or other similar operational parameter calibration application can be executed by the processing unit 24 to execute the steps of the methodology described above. The software can also be stored in a storage device 926 as taught below. The computing device 151 also includes configurable and/or programmable processing unit 24 and associated core(s) 904, and optionally, one or more additional configurable and/or programmable processing unit(s) 902' and associated core(s) 904' (for example, in the case of computer systems having multiple processors/cores), for executing computer-readable and computer-executable instructions or software stored in the memory 906 and other programs for implementing some embodiments of the present disclosure. Processing unit 24 and processing unit(s) 902' may each be a single core processor or multiple core (904 and 904') processor. Either or both of processing unit 24 and processing unit(s) 902' may be configured to execute one or more of the instructions taught in connection with the computing device 151.

Virtualization may be employed in the computing device 151 so that infrastructure and resources in the computing device 151 may be shared dynamically. A virtual machine 912 may be provided to handle a process running on multiple processors so that the process appears to be using only one computing resource rather than multiple computing resources. Multiple virtual machines may also be used with one processor.

Memory 906 may include a computer system memory or random access memory, such as DRAM, SRAM, EDO RAM, and the like. Memory 906 may include other types of memory as well, or combinations thereof.

A user may interact with the computing device 151 through a visual display device 914, such as a computer monitor, which may display one or more graphical user interfaces 94. The user may interact with the computing device 151 through a multi-point touch interface 920 or a pointing device 918 in some embodiments.

The computing device 151 may also include one or more storage devices 926, such as a hard-drive, CD-ROM, or other computer readable media, for storing data and computer-readable instructions and/or software that implement some embodiments of the present disclosure.

The computing device 151 can include a network interface 908 configured to interface via one or more network devices 924 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In some embodiments, the computing device 151 can include one or more antennas 922 to facilitate wireless communication (e.g., via a network interface 908) between the computing device 151 and a network. The network interface 908 may include a built-in network adapter, network interface card, PCMCIA network card, card bus network adapter, wireless network adapter, USB network adapter, modem or any other device suitable for interfacing the computing device 151 to any type of network capable of communication and performing the operations taught herein.

The computing device 151 may run any operating system 911, such as any of the versions of the Microsoft® Windows® operating systems, the different releases of the Unix® and Linux® operating systems, any version of the MacOS® for Macintosh computers, any embedded operating system, any real-time operating system, any open source operating system, any proprietary operating system, or any other operating system capable of running on the computing device 151 and performing the operations taught herein. In some embodiments, the operating system 911 may be run in native mode or emulated mode. In an exemplary embodiment, the operating system 911 may be run on one or more cloud machine instances.

Figure 9:
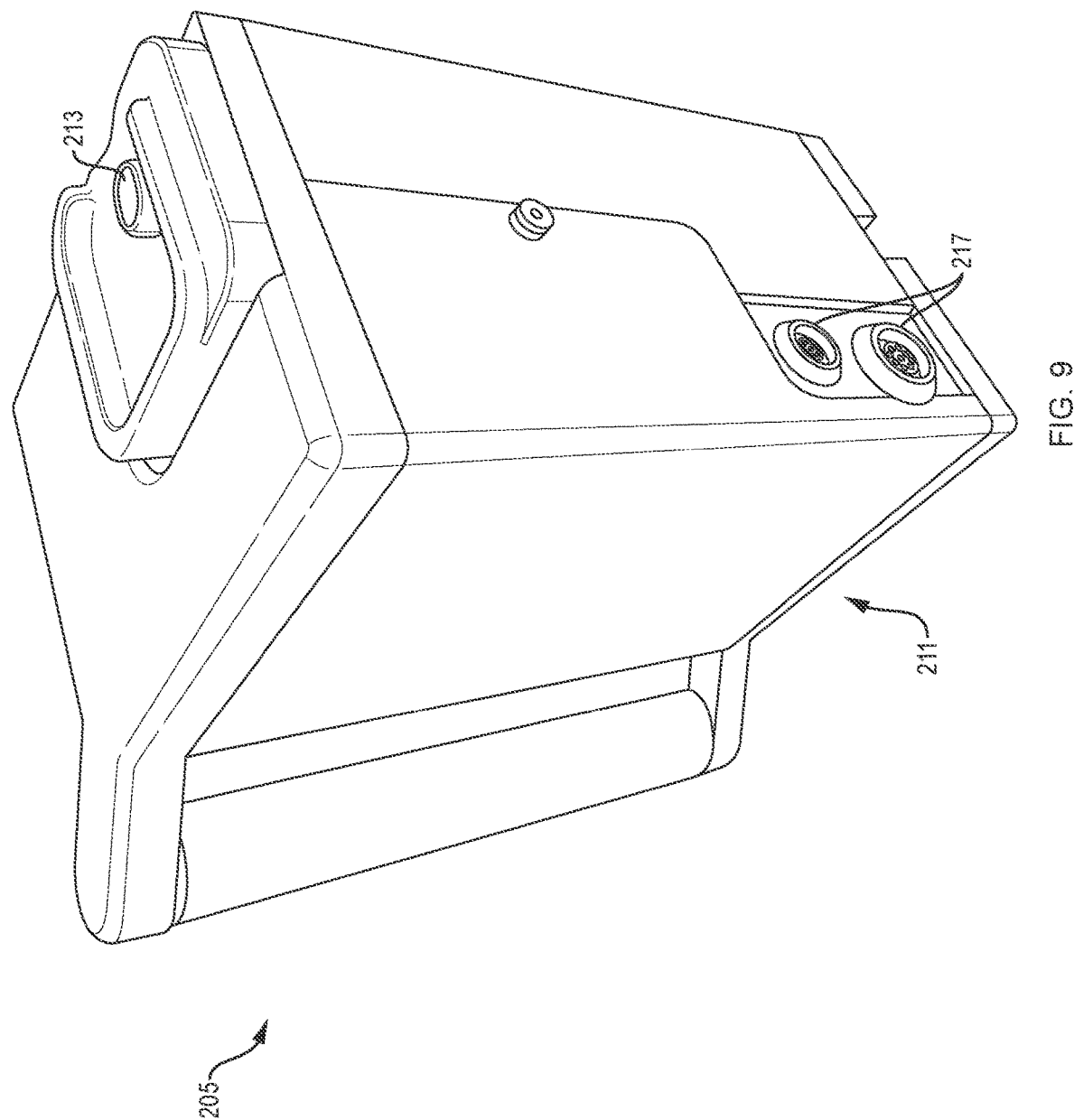
FIG. 9 depicts a view of a monitoring system as taught herein.

FIG. 9 depicts a monitoring system 205 as taught herein. The housing 211 of the monitoring system 205 can conceal the electromagnetic radiation source or detector to prevent direct user access or to protect these components from environmental conditions such as humidity. The housing includes an opening 213 through which adjacent non-targeted droplets pass to be measured by the monitoring system 205. The monitoring system 205 can include one or more ports or connectors 217 to enable connection of interior components (such as the electromagnetic radiation source or the detector) to a power source or the computing device 151.

As will be apparent to those of skill in the art upon reading this disclosure, each of the embodiments taught and illustrated herein has discrete components and features which may be readily separated from or combined with the features of any of the other several embodiments without departing from the scope or spirit of the present disclosure. Any recited method can be carried out in the order of events recited or in any other order that is logically possible.

What is claimed is:

1. A system for sorting particles flowing in a fluid stream, comprising:
    a particle delivery device for delivering a sequence of two or more sortable units from a fluid stream to an inspection zone;
    an electromagnetic radiation source for interrogating the two or more sortable units at the inspection zone;
    a sorter downstream of the electromagnetic radiation source to sort the two or more sortable units based on a characteristic thereof using a sort logic;
    a monitoring system downstream of the sorter to interrogate non-targeted sortable units that were adjacent to targeted sortable units that are predicted to include one or more particles having a predetermined characteristic of interest in the sequence of sortable units; and
    a processing unit operatively connected to the sorter and the monitoring system, the processing unit configured to execute instructions to adjust an operational parameter of the sort logic based upon a result of the interrogation of the adjacent non-targeted sortable units, and configured to execute instructions to sweep a sort delay parameter to determine crossing sort delay values where an intensity value received from the monitoring system crosses a threshold intensity value.

2. The system of claim 1, wherein at least one adjacent non-targeted sortable unit was upstream in sequence from at least one targeted sortable unit that included one or more particles having the predetermined characteristic of interest in the fluid stream.

3. The system of claim 1, wherein at least one adjacent non-targeted sortable unit was downstream in sequence from at least one targeted sortable unit that included one or more particles having the predetermined characteristic of interest in the fluid stream.

4. The system of claim 1, wherein the sorter deflects the targeted sortable units that are predicted to include one or more particles having the predetermined characteristic of interest from the fluid stream.

5. The system of claim 1, wherein the sorter deflects the adjacent non-targeted sortable units from the fluid stream.

6. The system of claim 1, wherein the sorter deflects the targeted sortable units that are predicted to include one or more particles having the predetermined characteristic of interest in a first direction and does not deflect the adjacent non-targeted sortable units.

7. The system of claim 1, wherein the targeted sortable units that are predicted to include one or more particles having the predetermined characteristic of interest or the adjacent non-targeted sortable units are fluid droplets.

8. The system of claim 1, wherein the targeted sortable units that are predicted to include one or more particles having the predetermined characteristic of interest or the adjacent non-targeted sortable units are sortable fluid segments of the fluid stream flowing in a microfluidic channel.

9. The system of claim 1, wherein the monitoring system interrogates the adjacent non-targeted sortable units using the electromagnetic radiation source.

10. The system of claim 1, wherein the monitoring system includes a second electromagnetic radiation source to interrogate the adjacent non-targeted sortable units.

11. The system of claim 1, wherein adjusting the operational parameter includes adjusting a sort delay.

12. The system of claim 1, wherein adjusting the operational parameter includes adjusting a parameter of a purity mask.

13. A method for calibration of particle sorting in a fluid stream, comprising:
    delivering a sequence of two or more sortable units from a fluid stream to an inspection zone using a particle delivery device;
    interrogating the two or more sortable units using an electromagnetic radiation source at the inspection zone;
    sorting, using a sorter downstream of the electromagnetic radiation source, the two or more sortable units based on a characteristic thereof using a sort logic;
    interrogating non-targeted sortable units that were adjacent to targeted sortable units that are predicted to include one or more particles having a predetermined characteristic of interest in the sequence of sortable units using a monitoring system;
    sweeping a sort delay in the sort logic while interrogating the adjacent non-targeted sortable units;
    selecting a value for the sort delay for which a detected intensity from the adjacent non-targeted sortable units is minimum; and
    determining if an operational parameter of the sort logic needs adjusting based upon a result of the interrogation of the adjacent non-targeted sortable units.

14. The method of claim 13, wherein selecting the value for the sort delay further comprises identifying the minimum detected intensity bracketed by two peak intensity values that are larger than a background intensity value.

15. The method of claim 13, wherein adjusting the sort logic includes adjusting a parameter of a purity mask.

16. A non-transitory computer-readable medium holding computing device-executable instructions for calibrating particle sorting in a fluid stream, the instructions when executed causing at least one computing device to:
deliver a sequence of two or more sortable units from a fluid stream to an inspection zone using a particle delivery device operatively connected to the at least one computing device;
interrogate the two or more sortable units using an electromagnetic radiation source at the inspection zone;
sort, using a sorter downstream of the electromagnetic radiation source, the two or more sortable units based on a characteristic thereof using a sort logic;
interrogate non-targeted sortable units that were adjacent to targeted sortable units that are predicted to include one or more particles having a predetermined characteristic of interest in the sequence of sortable units using a monitoring system;
sweep a sort delay in the sort logic while interrogating the adjacent non-targeted sortable units;
select a value for the sort delay for which a detected intensity from the adjacent non-targeted sortable units is minimum; and
determine if an operational parameter of the sort logic needs adjustment based upon a result of the interrogation of the adjacent non-targeted sortable units.

17. The non-transitory computer-readable medium of claim 16, wherein the instructions to select the value for the sort delay further comprise instructions to identify the minimum detected intensity bracketed by two peak intensity values that are larger than a background intensity value.

\* \* \* \* \*